United States Patent
Schaefer et al.

(10) Patent No.: US 11,840,859 B2
(45) Date of Patent: Dec. 12, 2023

(54) WIRE STRAND ATTACHMENT CLIP

(71) Applicant: Illinois Tool Works Inc., Glenview, IL (US)

(72) Inventors: Patrick D. Schaefer, Gurnee, IL (US); Ninad C. Maniar, Gurnee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 188 days.

(21) Appl. No.: 17/406,911

(22) Filed: Aug. 19, 2021

(65) Prior Publication Data

US 2022/0081929 A1   Mar. 17, 2022

Related U.S. Application Data

(60) Provisional application No. 63/077,251, filed on Sep. 11, 2020.

(51) Int. Cl.
*E04H 17/10* (2006.01)
*E04H 17/12* (2006.01)
*H02G 3/04* (2006.01)

(52) U.S. Cl.
CPC .......... *E04H 17/124* (2021.01); *E04H 17/12* (2013.01); *H02G 3/0456* (2013.01)

(58) Field of Classification Search
CPC ........ E04H 17/10; E04H 17/12; E04H 17/124
See application file for complete search history.

(56) References Cited

U.S. PATENT DOCUMENTS

| | | |
|---|---|---|
| 554,977 A | 2/1896 | Blecher |
| 925,229 A | 6/1909 | Rider |
| 1,454,254 A | 5/1923 | Lee |
| 1,499,933 A | 7/1924 | Jones |
| 1,714,388 A * | 5/1929 | McBride ............... E04H 17/124 256/52 |
| 1,814,228 A | 7/1931 | Peters |
| 1,855,136 A | 4/1932 | Ochiltree |
| 2,355,767 A | 8/1944 | White |
| 2,467,604 A | 4/1949 | Tinnerman |
| 2,631,804 A | 3/1953 | Uhlhorn |
| 2,802,644 A | 8/1957 | Ferdinand et al. |
| 3,411,754 A | 11/1968 | Fahrenholz |

(Continued)

FOREIGN PATENT DOCUMENTS

| | | |
|---|---|---|
| DE | 10 2011 013292 | 9/2012 |
| FR | 2476191 A1 * | 8/1981 |

(Continued)

OTHER PUBLICATIONS

Clip Bender image (available prior to Sep. 11, 2020)(1 page).

(Continued)

*Primary Examiner* — Jonathan P Masinick

(74) *Attorney, Agent, or Firm* — Neal, Gerber & Eisenberg LLP

(57) ABSTRACT

A wire strand attachment clip including an alignment guide connector, a first wire strand holder connected to and extending from the alignment guide connector, and a second wire strand holder connected to and extending from the alignment guide connector, wherein the alignment guide connector is attachable to an alignment guide of a support post such that the first and second wire strand holders can receive and hold the wire strand to that support post.

17 Claims, 17 Drawing Sheets

(56) References Cited

U.S. PATENT DOCUMENTS

| | | | |
|---|---|---|---|
| 3,508,730 A | 4/1970 | Knezo, Jr. | |
| 3,820,758 A | 6/1974 | Berg et al. | |
| 4,077,611 A * | 3/1978 | Wilson | H01B 17/145 256/10 |
| 4,114,241 A | 9/1978 | Bisping | |
| 4,403,759 A | 9/1983 | Hicks | |
| 4,717,123 A * | 1/1988 | Wrigley | E04H 17/124 256/48 |
| 4,936,550 A | 6/1990 | Wickham et al. | |
| 4,982,932 A * | 1/1991 | Baker | E04H 17/12 256/48 |
| 5,085,409 A * | 2/1992 | Teixeira | E04H 17/12 256/48 |
| 5,350,155 A | 9/1994 | Burk | |
| D368,932 S | 4/1996 | Mussalo | |
| D399,727 S | 10/1998 | Richter | |
| 5,884,695 A | 3/1999 | Brownlee | |
| D416,859 S * | 11/1999 | Langlie | D13/129 |
| 6,050,549 A | 4/2000 | Foy | |
| D430,005 S | 8/2000 | Stearns et al. | |
| D436,522 S | 1/2001 | Neider et al. | |
| D462,447 S | 9/2002 | Doyle | |
| 6,499,514 B1 | 12/2002 | Hodge | |
| 6,583,363 B1 * | 6/2003 | Wilson, Jr. | H01B 17/145 256/10 |
| 6,619,627 B2 | 9/2003 | Salisbury et al. | |
| 6,705,598 B2 | 3/2004 | Collins | |
| 6,883,785 B1 | 4/2005 | Knapp | |
| 7,511,227 B2 | 3/2009 | Ritchie | |
| D618,985 S | 7/2010 | Sjoeqvist | |
| 7,960,654 B2 | 6/2011 | Ritchie | |
| 7,968,797 B2 | 6/2011 | Williams | |
| 8,141,853 B2 | 3/2012 | Malins | |
| 8,480,061 B2 | 7/2013 | Graves | |
| D713,947 S | 9/2014 | Jensen | |
| D715,623 S | 10/2014 | Holtby et al. | |
| 8,893,458 B2 | 11/2014 | Lawson et al. | |
| 8,910,803 B2 | 12/2014 | Holtby et al. | |
| D735,558 S | 8/2015 | Kopp | |
| D739,221 S | 9/2015 | Sendra-gonzalez et al. | |
| 9,234,367 B2 | 1/2016 | Kopp | |
| D814,906 S | 4/2018 | Pine | |
| D840,787 S | 2/2019 | Pine | |
| D840,795 S | 2/2019 | Tribbett | |
| D841,430 S | 2/2019 | Pine | |
| 10,323,436 B2 | 6/2019 | White et al. | |
| 10,358,840 B2 | 7/2019 | Hiner et al. | |
| D856,119 S | 8/2019 | Mcgugan et al. | |
| 10,428,554 B2 * | 10/2019 | Johns | E04H 17/124 |
| 10,593,168 B2 | 3/2020 | Brown | |
| D885,873 S | 6/2020 | Deng | |
| D913,525 S | 3/2021 | Xuewei et al. | |
| D915,873 S | 4/2021 | Phy et al. | |
| D926,022 S | 7/2021 | Luhrmann | |
| D938,816 S | 12/2021 | Byerly et al. | |
| D942,256 S | 2/2022 | Christiansen et al. | |
| D950,367 S | 5/2022 | Elliott | |
| D964,550 S | 9/2022 | Hall | |
| D966,081 S | 10/2022 | Li | |
| D967,698 S | 10/2022 | Holguin | |
| D979,378 S * | 2/2023 | Schaefer | D8/356 |
| 2002/0134975 A1 * | 9/2002 | Hancock | E04H 17/12 256/47 |
| 2006/0131469 A1 | 6/2006 | Roy | |
| 2008/0001134 A1 * | 1/2008 | Coley | E04H 17/124 256/1 |
| 2008/0054143 A1 | 3/2008 | Collins et al. | |
| 2008/0121763 A1 | 5/2008 | Mori et al. | |
| 2010/0283023 A1 | 11/2010 | Thompson | |
| 2012/0067007 A1 | 3/2012 | Lawson et al. | |
| 2015/0028604 A1 | 1/2015 | Lankford | |
| 2015/0144856 A1 | 5/2015 | Kopp | |
| 2016/0221715 A1 | 8/2016 | Pratt | |
| 2018/0223560 A1 * | 8/2018 | Malins | E04H 17/124 |
| 2020/0256085 A1 | 8/2020 | Hiner et al. | |
| 2021/0131139 A1 * | 5/2021 | Vith Hansen | E04H 17/12 |
| 2022/0098896 A1 | 3/2022 | Schilleman | |

FOREIGN PATENT DOCUMENTS

| | | |
|---|---|---|
| FR | 2978808 A1 | 2/2013 |
| GB | 1207741 A | 10/1970 |
| GB | 1323388 A | 7/1973 |
| GB | 2187771 A | 9/1987 |
| WO | WO 2011/020165 | 2/2011 |

OTHER PUBLICATIONS

Fence Fork Clips image (available prior to Sep. 11, 2020)(1 page).

LockJawz—The Last T-Post Insulator You Will Ever Need, retrieved from the Internet at https://www.lockjawz.com/, on Sep. 29, 2020 (available prior to Sep. 11, 2020)(10 pages).

Stay-Tuff T Post Clip & 11ga drill chuck image (available prior to Sep. 11, 2020)(1 page).

T-Post Clips—CHS image (available prior to Sep. 11, 2020)(1 page).

T-Post Clips—CMC image (available prior to Sep. 11, 2020)(1 page).

T-Post Gripper—Goldenrod image (available prior to Sep. 11, 2020)(1 page).

* cited by examiner

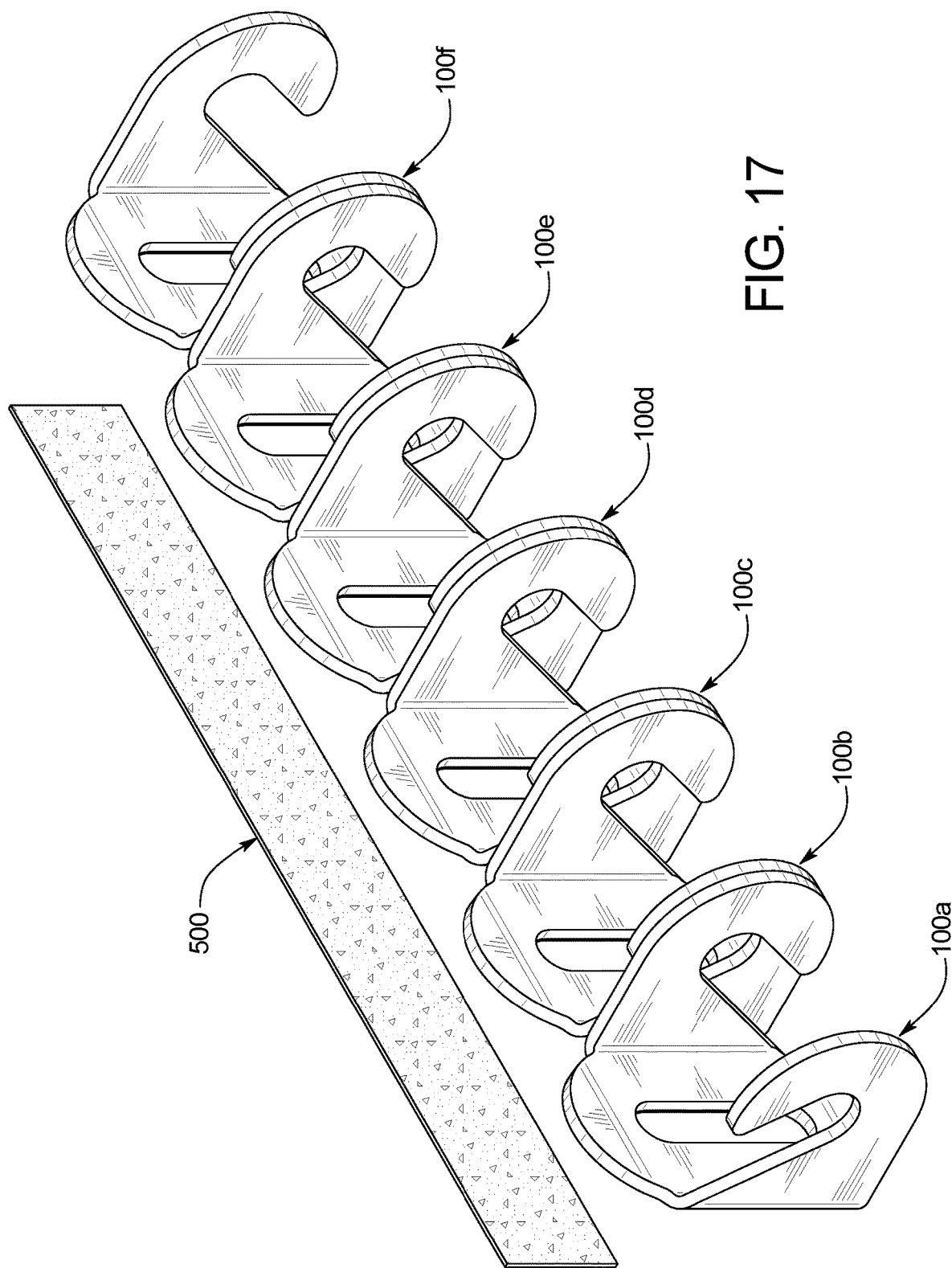

WIRE STRAND ATTACHMENT CLIP

PRIORITY

This application claims priority to and the benefit of U.S. Provisional Patent Application Ser. No. 63/077,251, filed Sep. 11, 2020, the entire contents of which are incorporated herein by reference.

CROSS REFERENCE TO RELATED APPLICATION

The subject matter of this application is related to the subject matter of U.S. Design patent application Ser. No. 29/750,238, filed Sep. 11, 2020.

BACKGROUND

Various widely used fences (such as boundary fences, farm fences, and livestock boundary fences) have incorporated a series of wire strands (such as an electrically conductive metal single wire, barbed wire, or other wire with multiple strands) attached to a series of metal support posts that are each secured in the ground. The metal support posts frequently used for such fences include a ground securing mechanism connected to an elongated stem. The elongated stem extends upwardly (typically vertically) from the ground securing mechanism. The elongated stem typically has a T-shaped cross-section and typically has spaced-apart outwardly extending or protruding alignment guides that are sometimes employed to maintain the spacing of wire strands that form the fence.

In various known fences, each of the wire strands are secured to each of the metal posts by a wire strand attachment device. Various known wire strand attachment devices have been employed. For example, one such known wire strand attachment device includes a short length of attachment wire that has a first end wrapped around the wire strand, a middle section passed around the metal support post, and a second end wrapped around the wire strand to hold the wire strand to the metal support post. To attain a tightly stretched and secured fence when using the this wire strand attached device, it is often necessary to employ a tool such as a wire puller in tandem. This is a time-consuming and cumbersome task, especially in view of the large quantity of such wire strand attachment devices that are needed to build a typical large boundary fence.

While various other wire strand attachment devices have been proposed and employed to solve this problem, there is a continuing need for improved wire strand attachment devices that can be quickly, easily, and cost effectively employed to attach wire strands to support posts.

SUMMARY

Various embodiments of the present disclosure provide a wire strand attachment clip that can be quickly, easily, and cost effectively used to attach a wire strand to a support post such as a barbed and/or electrically conductive metal wire strand to a T-shaped metal support post. In various embodiments, a plurality of wire strand attachment clips of the present disclosure can be quickly, easily, and cost effectively used to attach a plurality of wire strands to a plurality of support posts to build a fence. In various embodiments, a plurality of wire strand attachment clips of the present disclosure can be employed as an integrated total wire strand fastening system for attaching a plurality of wire strands to a plurality of posts.

In various embodiments of the present disclosure, the wire strand attachment clip includes an alignment guide connector, a first wire strand holder connected to and extending from the alignment guide connector, and a second wire strand holder connected to and extending from the alignment guide connector. Generally, the alignment guide connector is dimensionally configured to snap onto a T-shaped support post to attach a wire strand to that T-shaped support post, and particularly such that the alignment guide connector engage(s) an alignment guide of the T-shaped support post, and such that the first and second wire strand holders engage and hold the wire strand to the T-shaped support post.

Other objects, features, and advantages of the present disclosure will be apparent from the following detailed disclosure and accompanying drawings.

BRIEF DESCRIPTION OF THE FIGURES

FIG. 17 is an exploded perspective view of a collated group of a plurality of the wire strand attachment clips of FIGS. 1 and 2.

DETAILED DESCRIPTION

Figure 1:
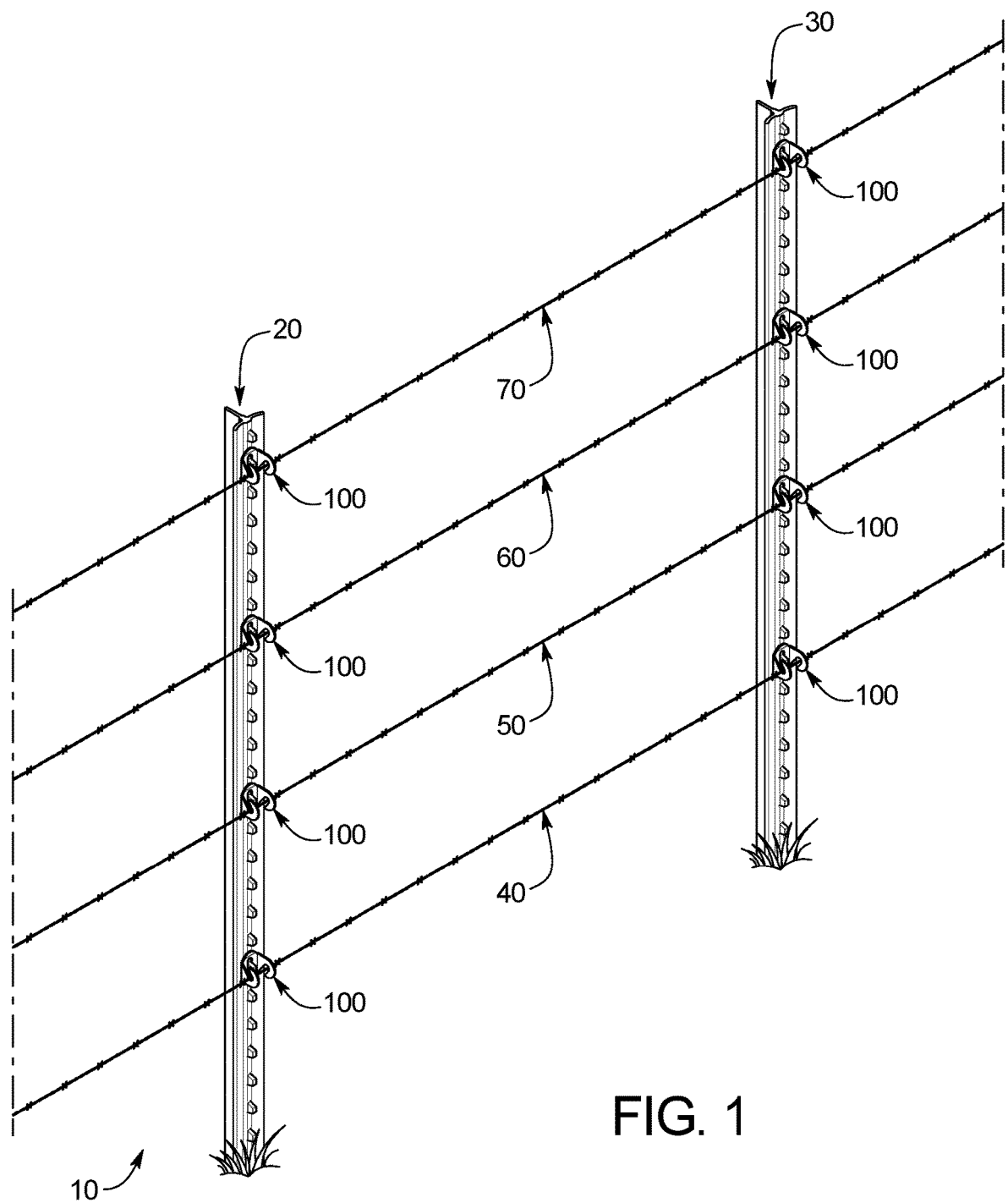
FIG. 1 is a fragmentary perspective view of a portion of an example boundary fence including a plurality of example vertically spaced apart T-shaped support posts and a plurality of example horizontally spaced apart wire strands attached to the plurality of spaced apart T-shaped support posts by a plurality of wire strand attachment clips of one example embodiment of the present disclosure.

While the systems, devices, and methods described herein may be embodied in various forms, the drawings show and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

FIGS. 1 to 17 illustrate one example embodiment of a wire strand attachment clip of the present disclosure that is generally indicated by numeral 100 (and that may be sometimes referred to herein as a "clip" for brevity). FIG. 1 generally shows how a plurality of the illustrated example wire strand attachment clips 100 attach a plurality of example horizontally spaced apart wire strands 40, 50, 60, and 70 to a plurality of example T-shaped support posts 20 and 30 to form part of an example boundary fence 10. It should be appreciated that the wire strand attachment clip 100 of the present disclosure can be employed with different wire strands and different support posts in accordance with the present disclosure.

As best shown in FIGS. 2 to 16, the illustrated example wire strand attachment clip 100 includes: (1) an alignment guide connector 110; (2) a first wire strand holder 140 integrally connected to and extending from a first side of the alignment guide connector 110; and (3) a second wire strand holder 170 integrally connected to and extending from a second opposite side of the alignment guide connector 110. Generally, the alignment guide connector 110 is dimensionally configured to snap onto any one of a plurality of outwardly and forwardly extending or protruding alignment guides (such as alignment guide 22) of a T-shaped support post (such as post 20) to attach a wire strand (such as strand 40) to that T-shaped support post (such as post 20), and particularly such that the alignment guide connector 110 securely engages the spaced apart opposite side surfaces (such as side surfaces 22A and 22B) of the outwardly extending or protruding alignment guide (such as alignment guide 22) of the T-shaped support post (such as post 20), and such that the first and second wire strand holders 140 and 170 can engage and hold a wire strand (such as wire strand 40) to the T-shaped support post (such as post 20), as further described below.

In this illustrated example embodiment, the wire strand attachment clip 100 is formed (and particularly bent) into its shape from a flat solid metal plate (such as a carbon spring steel plate) having about a 0.0625 inch (about 1.5 mm) thickness and a suitable length and height. It should be appreciated that before the plate is bent, the curvatures and the openings (discussed below) are suitably formed (such as via a suitable stamping or cutting process). It should be appreciated that the wire strand attachment clip 100 can be formed from other suitable materials and formed from other substrates having other suitable dimensions. The wire strand attachment clip 100 is formed such that the alignment guide connector 110, the first wire strand holder 140, and the second wire strand holder 170 each have a desired amount of rigidity and flexibility relative to each other, and a reasonably strong bias back toward their respective original positions relative to each other, as further described below.

More specifically, as best shown in FIGS. 3, 4, 5, 6, 7, 8, 9, and 10, the illustrated example alignment guide connector 110 includes: (1) an alignment guide engager 114; (2) a first rigidity tab 130 connected to and extending upwardly and forwardly outwardly from a first (top) end of the alignment guide engager 114; and (3) a second rigidity tab 132 connected to and extending downwardly and forwardly outwardly from a second end of the alignment guide engager 114.

The alignment guide engager 114 includes a generally flat body 116 that defines a centrally positioned oval alignment guide receiving slot 118. The body 116 has a substantially flat front surface 117F and a substantially flat back surface 117б. The body 116 includes: (1) a first side section 120 that includes an inner alignment guide engagement edge 121 that partially defines the alignment guide receiving slot 118; (2) a second side section 122 that includes an inner alignment guide engagement edge 123 that partially defines the alignment guide receiving slot 118; (3) a first (top) end section 124 that includes an inner edge 125 that partially defines the alignment guide receiving slot 118; and (4) a second end section 126 that includes an inner edge 127 that partially defines the alignment guide receiving slot 118.

In this illustrated example embodiment, the height H of the alignment guide receiving slot 118 is greater than the height of the alignment guide. In this illustrated example embodiment, the height H of the alignment guide receiving slot 118 is approximately 0.88 inches (20.3 mm), but it should be appreciated that this height H may vary in accordance with the present disclosure (and particularly based on the height of the alignment guide of the post to which the clip will be attached). In this illustrated example embodiment, both the first end section 124 (and specifically the inner edge 125 of the first end section 124) and the second end section 126 (and specifically the inner edge 127 of the second end section 126) define the height H of the alignment guide receiving slot 118.

In this illustrated example embodiment, the width W of the alignment guide receiving slot 118 is slightly smaller than the width of the alignment guide 22. In this illustrated example embodiment, the width W of the alignment guide receiving slot 118 approximately 0.210 inches (5.33 mm), but it should be appreciated that this width W may vary in accordance with the present disclosure (and particularly based on the width of the alignment guide of the post to which the clip will be attached). In this illustrated example embodiment, both the first side section 120 (and specifically the inner alignment guide engagement edge 121 of the first side section 120) and the second side section 122 (and specifically the inner alignment guide engagement edge 123 of the second side section 12) define the width W of the alignment guide receiving slot 118.

In this illustrated example embodiment, the inner edge 125 of the first end section 124 and the inner edge 127 of the second end section 126 are configured to securely engage opposite sides 22A and 22B of the alignment guide 22 of the post 20. In this illustrated example embodiment, the inner edge 125 of the first side section 124 includes multiple angled surfaces (not labeled). Likewise, in this illustrated example embodiment, the inner edge 127 of the second side section 126 also includes multiple angled surfaces (not labeled). In various embodiments, the inner intersection edges formed by such angled surfaces form teeth that are configured to engage the opposite sides 22A and 22B of the alignment guide 22 of the post 20, such that removal forces applied to the clip 100 cause these teeth to further engage the opposite sides 22A and 22B of the alignment guide 22 to prevent removal of the clip 100 from the post 20.

It should be appreciated that in other embodiments of the present disclosure, (1) the quantity of surfaces that form the inner edge 125 and the quantity of surfaces that form the inner edge 127 may be vary; and (2) the angles of the surfaces that form the inner edge 125 and the angles of the surfaces that form the inner edge 127 may be vary relative to the front and back surfaces 117F and 117B and relative to each other. In various embodiments of the present disclosure, these edges can form one or more sharp engagement points or lines that are configured to engage the configured to securely engage opposite sides 22A and 22B of the alignment guide 22 of the post 20.

The first rigidity tab 130 is connected to and extends upwardly and forwardly outwardly from the first end section 124 of the alignment guide engager 114. The first rigidity tab 130 has a substantially flat front surface 130F and a substantially flat back surface 130B. The first rigidity tab 130 is connected to the first end section 124 at an angle A1. In various example embodiments, angle A1 can range from approximately 45 to 60 degrees; but it should be appreciated that this angle A1 may vary in accordance with the present disclosure. The first rigidity tab 130 has a curved outer edge 131, but it should be appreciated that this edge may be alternatively shaped in accordance with the present disclosure.

The second rigidity tab 132 is connected to and extends downwardly and forwardly outwardly from the second end section 126 of the alignment guide engager 114. The second rigidity tab 132 has a substantially flat front surface 132F and a substantially flat back surface 132B. The second rigidity tab 132 is also connected to the second end section 126 at an angle A2. In various example embodiments, angle A2 can range from approximately 45 to 75 degrees; but it should be appreciated that this angle A2 may vary in accordance with the present disclosure. The second rigidity tab 132 has a curved outer edge 133, but it should be appreciated that this edge may be alternatively shaped in accordance with the present disclosure.

The first rigidity tab 130 and the second rigidity tab 132 add structural rigidity to the alignment guide engager 114 and particularly the body 116 of the alignment guide engager 114. More specifically, the first rigidity tab 130 and the second rigidity tab 132 increase the rigidity of the alignment guide connector 110 in planes transverse to and particularly in planes perpendicular to the alignment guide 22 of the post 20. It should be appreciated that in alternative embodiments of the present disclosure, the alignment guide engager 114: (a) does not include such rigidity tabs; (2) includes only one rigidity tab; (3) includes more than two rigidity tabs; or (4) includes one or more otherwise shaped or configured rigidity tabs.

In this illustrated example embodiment, the first rigidity tab 130 and the second rigidity tab 132 are each curved sections formed from the solid cylindrical metal plate employed to form the wire strand attachment clip 100. In this illustrated example embodiment, the first rigidity tab 130 is symmetrical to the second rigidity tab 132. It should be appreciated that such rigidity tabs can be non-symmetrical in accordance with the present disclosure. In this illustrated example embodiment, the first rigidity tab 130 has the same respective dimensions as the second rigidity tab 132. It should be appreciated that such respective rigidity tabs can have different dimensions in accordance with the present disclosure.

When the alignment guide connector 110 is snapped onto the alignment guide 22 of a T-shaped support post 20 to attach the wire strand 40 to that T-shaped support post 20 as shown in FIGS. 1, 2, 11, 12, 13, 14, 15, and 16, the alignment guide connector 110 and particularly the alignment guide engager 114 provides a secure attachment of the wire strand attachment clip 100 to the alignment guide 22 and thus to the T-shaped support post 20. After such attachment, the first wire strand holder 140 and the second wire strand holder 170 are configured to co-act to receive and prevent the wire strand 40 from exiting the respective first and second wire strand receiving and holding areas 142 and 172 (described below).

Figure 13:
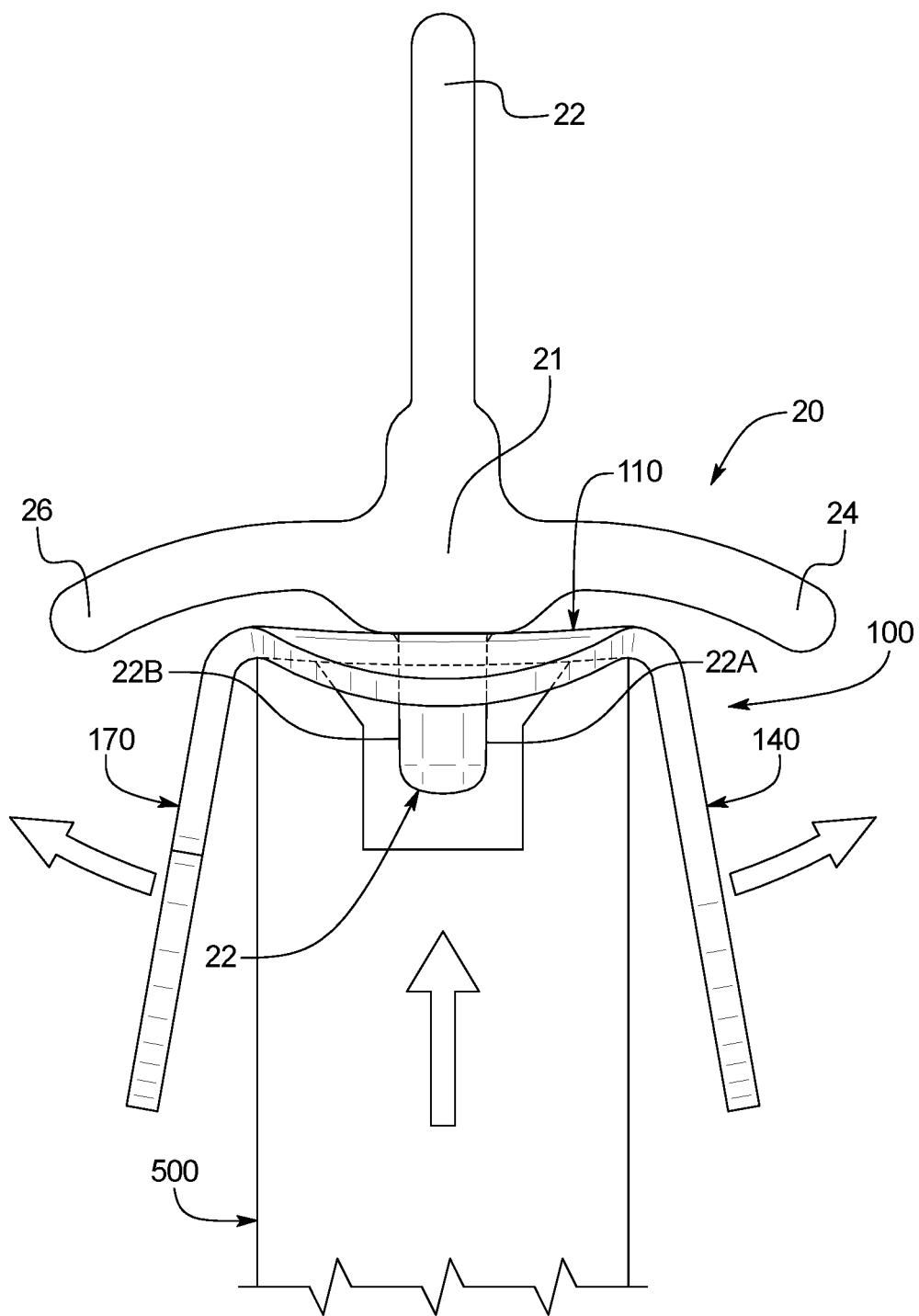
FIG. 13 is an enlarged top view of the wire strand attachment clip of FIGS. 1 and 2, an enlarged top view of the T-shaped support post of FIG. 2, and a fragmentary top view of an example installation tool of the present disclosure, after the attachment of the wire strand attachment clip to the T-shaped support post.
Figure 14:
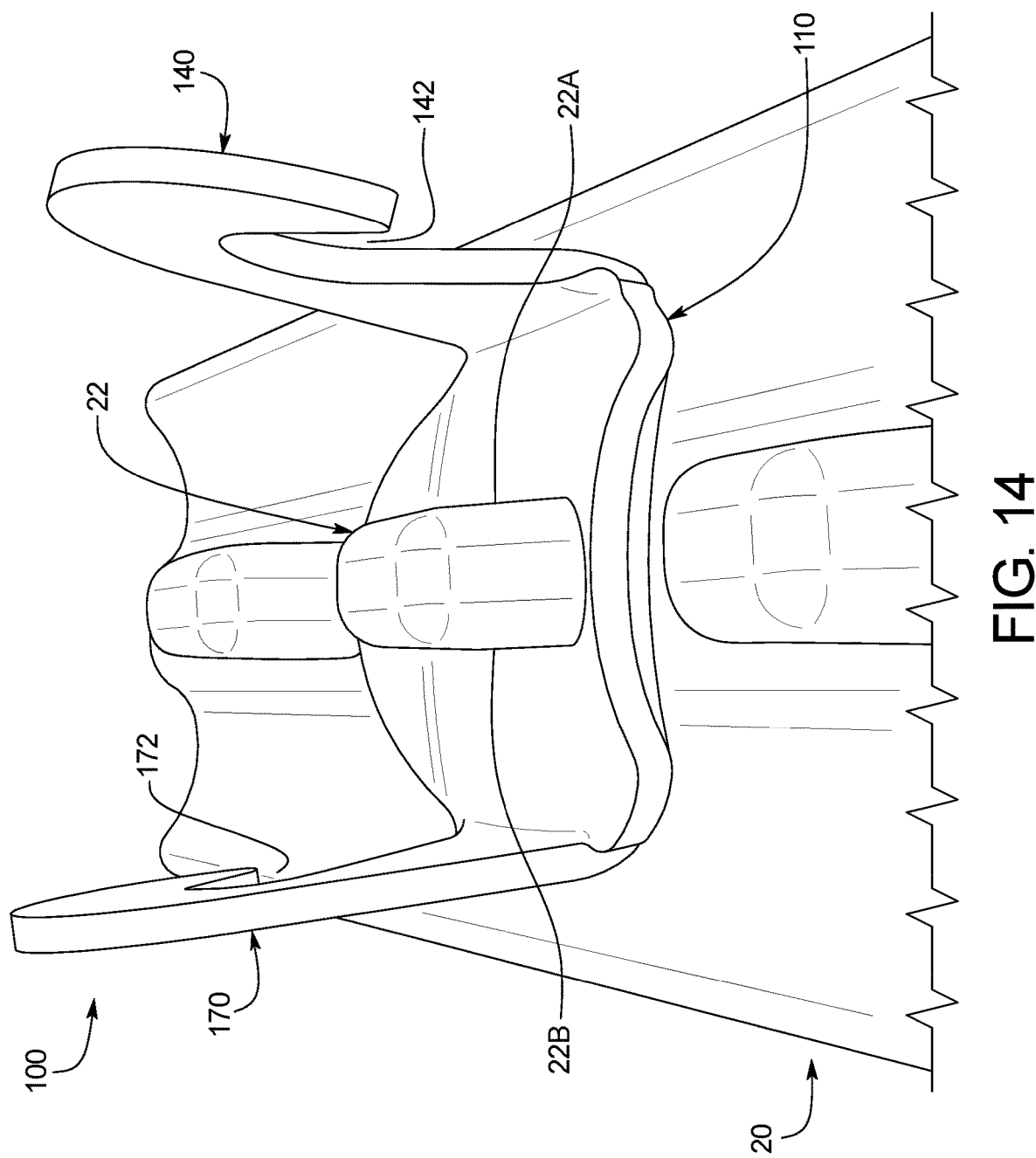
FIG. 14 is an enlarged bottom perspective view of the wire strand attachment clip of FIGS. 1 and 2, an enlarged fragmentary bottom perspective view of the T-shaped support post of FIG. 2, after the attachment of the wire strand attachment clip to the T-shaped support post.
Figure 15:
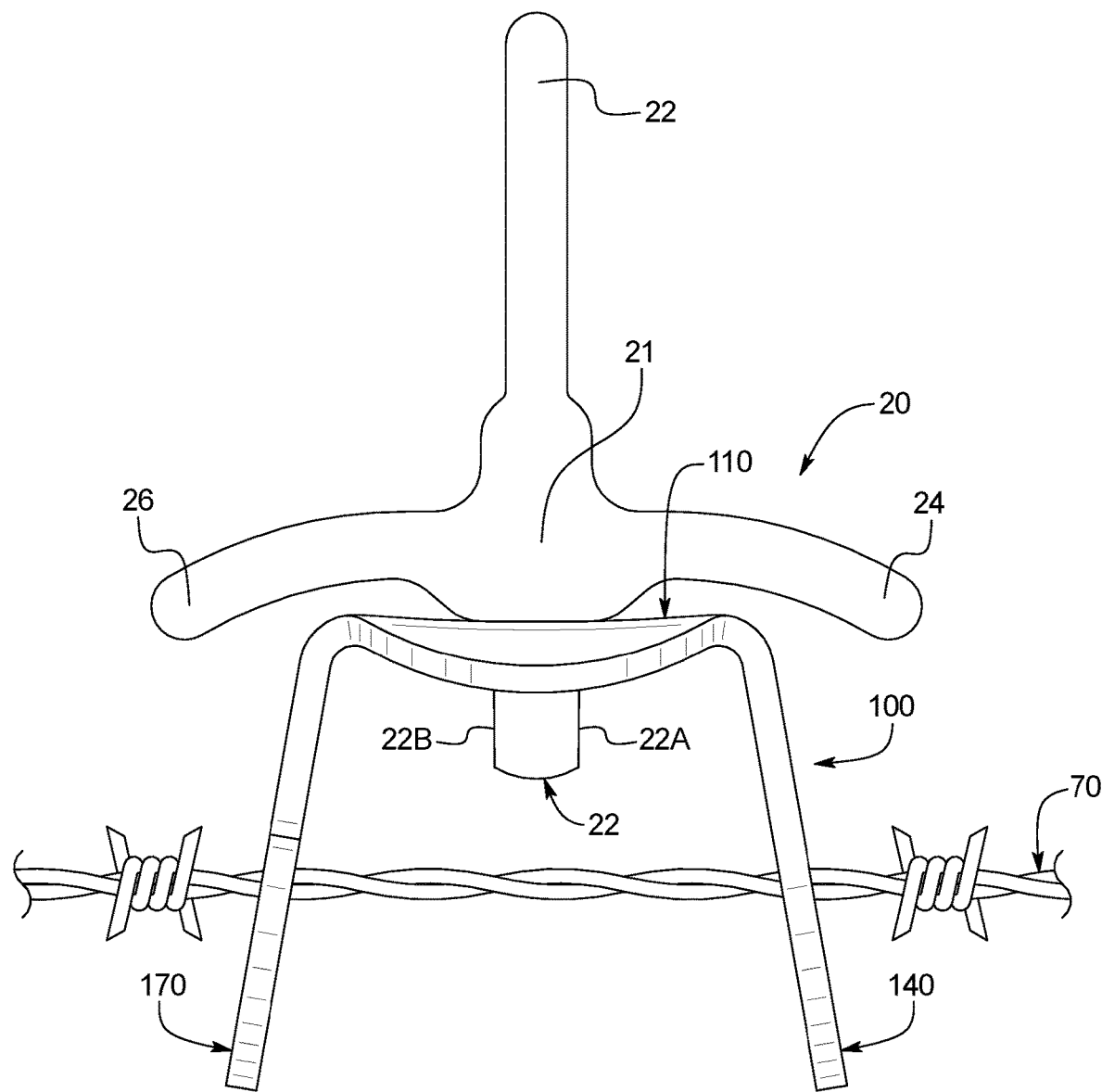
FIG. 15 is an enlarged top view of the wire strand attachment clip of FIGS. 1 and 2, an enlarged top view of the T-shaped support post of FIG. 2, and a fragmentary top view of an example wire strand held by the wire strand attachment clip to the T-shaped support post after attachment of the wire strand attachment clip to the T-shaped support post.

As best shown in FIGS. 3, 4, 5, 6, 7, 8, 9, and 10, the first wire strand holder 140 is connected to and extends forwardly outwardly from the first side section 120 of the alignment guide engager 114. The first wire strand holder 140 has a substantially flat inner surface 140I and a substantially flat outer surface 140O. The first wire strand holder 140 is connected to the first side section 120 at an angle B1 prior to installation. In this illustrated example embodiment, angle B1 is approximately 90 degrees, but it should be appreciated that this angle B1 may vary in accordance with the present disclosure. In this illustrated example embodiment, this angle changes to C1 after installation as shown in FIGS. 13, 14, and 15, and as further discussed below. However, it should be appreciated that this angle may not change after installation in accordance with the present disclosure.

The first wire strand holder 140 defines a first wire strand receiving and holding area 142 configured to receive the wire strand and also to allow for certain movements of the wire strand in the first wire strand receiving and holding area 142. More specifically, the illustrated example first wire strand holder 140 includes: (1) a first wire engager 144 integrally connected to and extending outwardly from the alignment guide engager 114; (2) a second wire engager 150 connected to and extending outwardly from the first wire engager 144; and (3) a third wire engager 160 connected to and extending upwardly and inwardly from the second wire engager 150. The first wire engager 144, the second wire engager 150, and the third wire engager 160 define the first wire strand receiving and holding area 142. The first wire engager 144 and the third wire engager 160 also define an opening 141 for the first wire strand receiving and holding area 142.

The first wire engager 144 includes an inner section (not labeled) connected to and extending forwardly outwardly from the first side section 120 of the alignment guide engager 114. The first wire engager 144 includes an outer section (not labeled) that has a smaller height than the inner section 145. The first wire engager 144 includes an upwardly angled inner edge 146 and an outwardly extending outer edge 147.

The second wire engager 150 includes an inner section (not labeled) connected to and extend forwardly outwardly from the outer section of the first wire engager 144. The second wire engager 150 includes an outer section (not labeled) that has a greater height than the inner section. The second wire engager 150 includes a concavely curved inner edge 156 and an upwardly convexly curved outer edge 158.

The third wire engager 160 includes an inner section (not labeled) connected to and extending rearwardly inwardly from the outer section of the second wire engager 150. The third wire engager 160 includes an outer section (not labeled) that has substantially the same height as the inner section. The third wire engager 160 includes a partially straight and partially curved inner edge 166 and a convexly curved outer edge 167.

Figure 2:
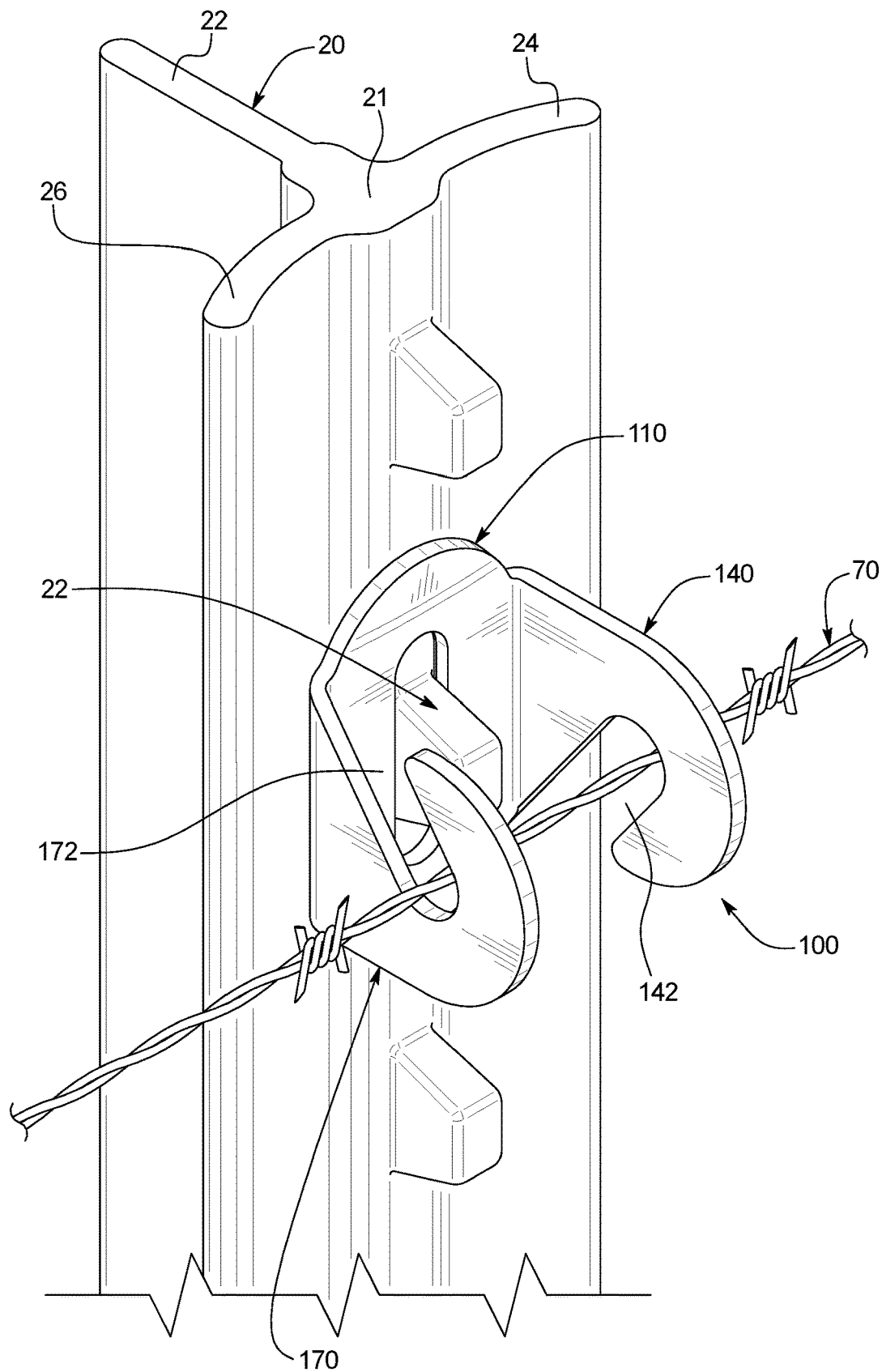
FIG. 2 is an enlarged fragmentary perspective view of a portion of one of the T-shaped support posts and one of the wire strands attached to the T-shaped support post of the boundary fence of FIG. 1, and showing one of the wire strand attachment clips of FIG. 1 attaching that wire strand to that T-shaped support post.
Figure 3:
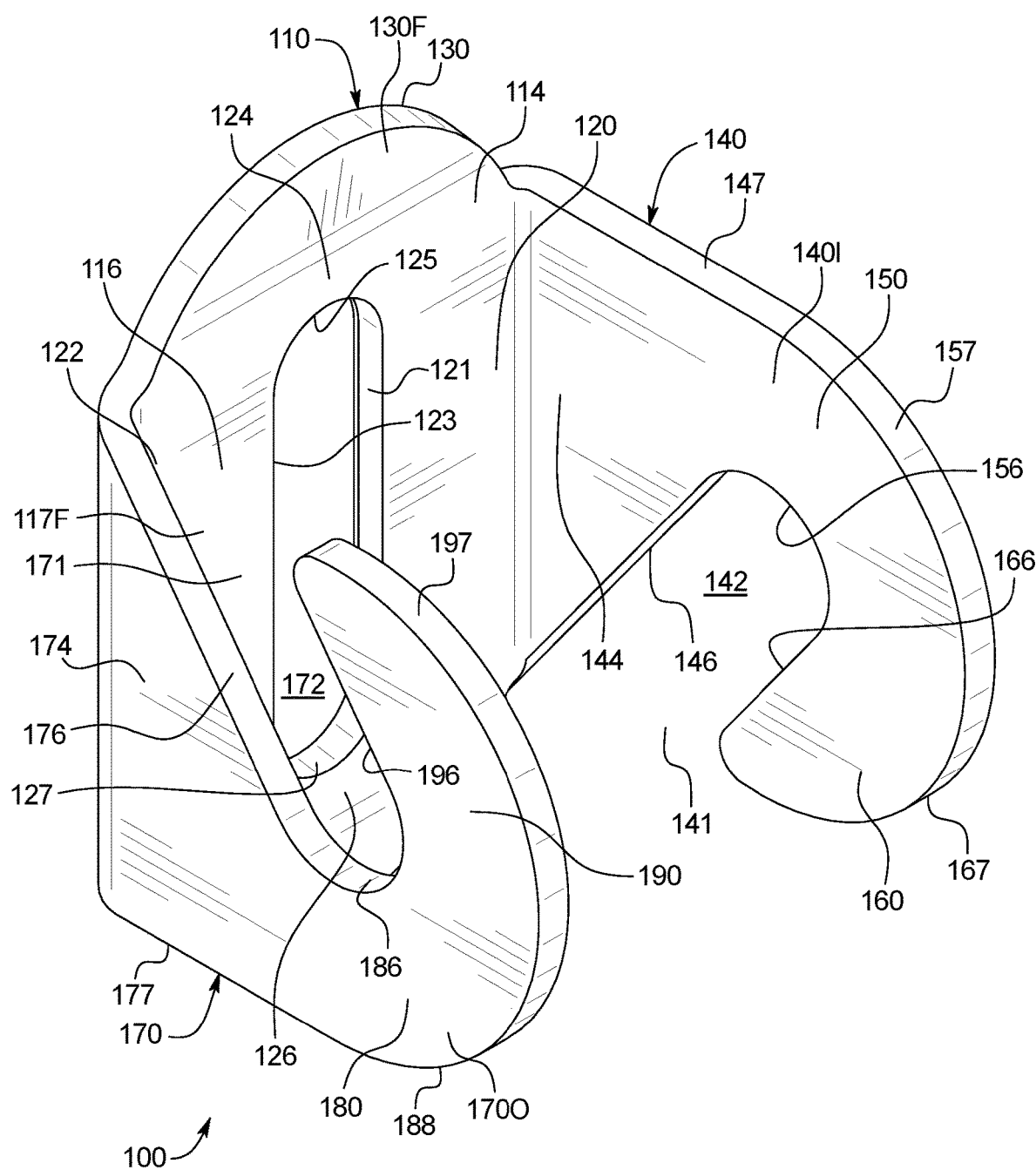
FIG. 3 is an enlarged perspective view of the wire strand attachment clip of FIGS. 1 and 2.

The inner edge 146, the inner edge 156, and the inner edge 166 define the first wire strand receiving and holding area 142. The first wire engager 144, the second wirer engager 150, and the third wire engager 160 function together to receive and hold the wire strand 40 as shown in FIGS. 2 and 15. The curved outer edge 167 of the third wire engager 160 facilitates the entry of the wire strand into the first wire strand receiving and holding area 142. The inner edge 146, the inner edge 156, and the inner edge 166 provide enough space for the wire strand 40 to be positioned in the first wire strand receiving and holding area 142 and to move within the first wire strand receiving and holding area 142 without coming out of the first wire strand receiving and holding area 142.

As best shown in FIGS. 3, 4, 5, 6, 7, 8, 9, and 10, the second wire strand holder 170 is connected to and extends forwardly outwardly from the second side section 122 of the alignment guide engager 114. The second wire strand holder 170 has a substantially flat inner surface 1701 and a substantially flat outer surface 1700. The second wire strand holder 170 is connected to the second side section 122 at an angle B2 prior to installation. In this illustrated example embodiment, angle B2 is approximately 90 degrees, but it should be appreciated that this angle B2 may vary in accordance with the present disclosure. In this illustrated example embodiment, this angle changes to C2 after installation as shown in FIGS. 13, 14, and 15, and as further discussed below. However, it should be appreciated that this angle may not change after installation in accordance with the present disclosure.

The second wire strand holder 170 defines a second wire strand receiving and holding area 172 configured to receive the wire strand and also to allow for certain movements of the wire strand in the second wire strand receiving and holding area 172. More specifically, the illustrated example second wire strand holder 170 includes: (1) a first wire engager 174 integrally connected to and extending outwardly from the alignment guide engager 114; (2) a second wire engager 180 connected to and extending outwardly from the first wire engager 174; and (3) a third wire engager 190 connected to and extending upwardly and inwardly from the second wire engager 180. The first wire engager 174, the second wire engager 180, and the third wire engager 190 define the first wire strand receiving and holding area 172. The first wire engager 174 and the third wire engager 190 also define an opening 171 for the first wire strand receiving and holding area 172.

The first wire engager 174 includes an inner section (not labeled) connected to and extending forwardly outwardly from the second side section 122 of the alignment guide engager 114. The first wire engager 174 includes an outer section (not labeled) that has a smaller height than the inner section 175. The first wire engager 174 includes a downwardly angled inner edge 176 and an outwardly extending outer edge 177.

The second wire engager 180 includes an inner section (not labeled) connected to and extending forwardly outwardly from the outer section of the first wire engager 174. The second wire engager 180 includes an outer section (not labeled) that has a greater height than the inner section. The second wire engager 180 includes a concavely curved inner edge 186 and an upwardly convexly curved outer edge 187.

The third wire engager 190 includes an inner section (not labeled) connected to and extending rearwardly inwardly from the outer section of the second wire engager 180. The third wire engager 190 includes an outer section (not labeled) that has substantially the same height as the inner section 191. The third wire engager 190 includes a partially straight and partially curved inner edge 196 and a convexly curved outer edge 197.

The inner edge 176, the inner edge 186, and the inner edge 196 define the second wire strand receiving and holding area 172. The first wire engager 174, the second wirer engager 180, and the third wire engager 190 function together to receive and hold the wire strand as shown in FIGS. 2 and 15. The curved outer edge 197 of the third wire engager 190 facilitates the entry of the wire strand into the second wire strand receiving and holding area 172. The inner edge 176, the inner edge 186, and the inner edge 196 provide enough space for the wire strand 40 to be positioned in the second wire strand receiving and holding area 172 and to move within the second wire strand receiving and holding area 172 without coming out of the second wire strand receiving and holding area 172.

Figure 4:
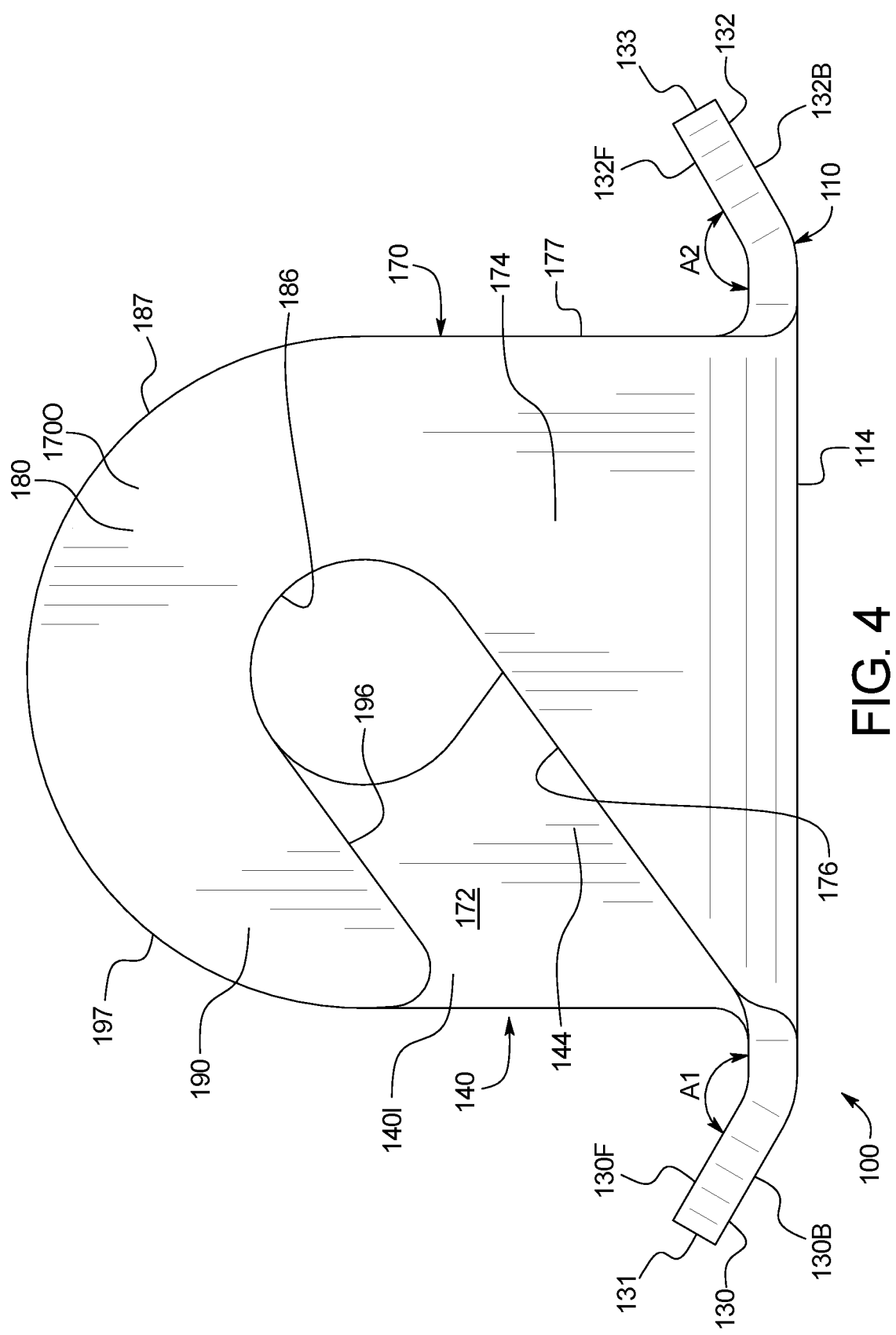
FIG. 4 is an enlarged first side view of the wire strand attachment clip of FIGS. 1 and 2.
Figure 5:
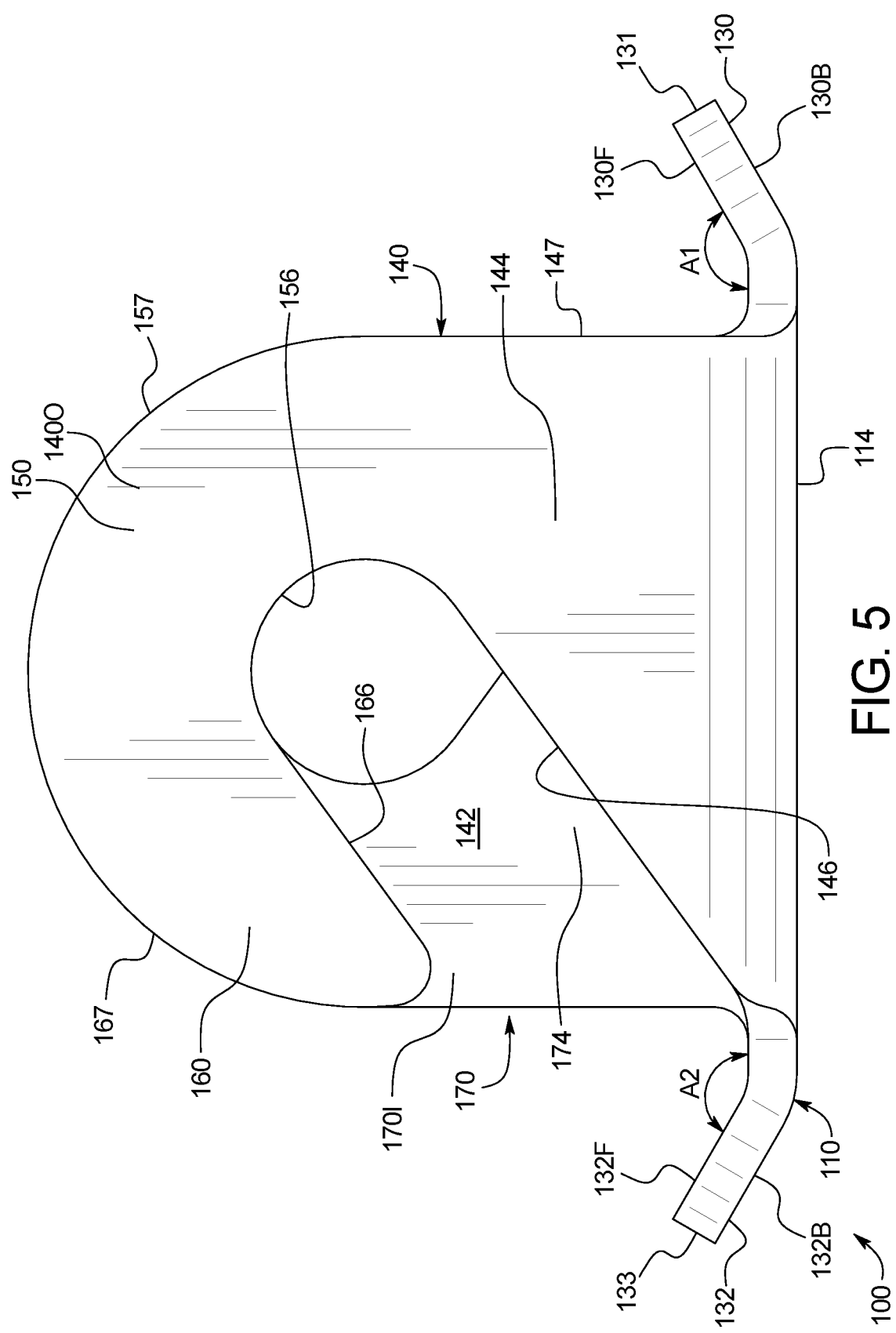
FIG. 5 is an enlarged second side view of the wire strand attachment clip of FIGS. 1 and 2.
Figure 6:
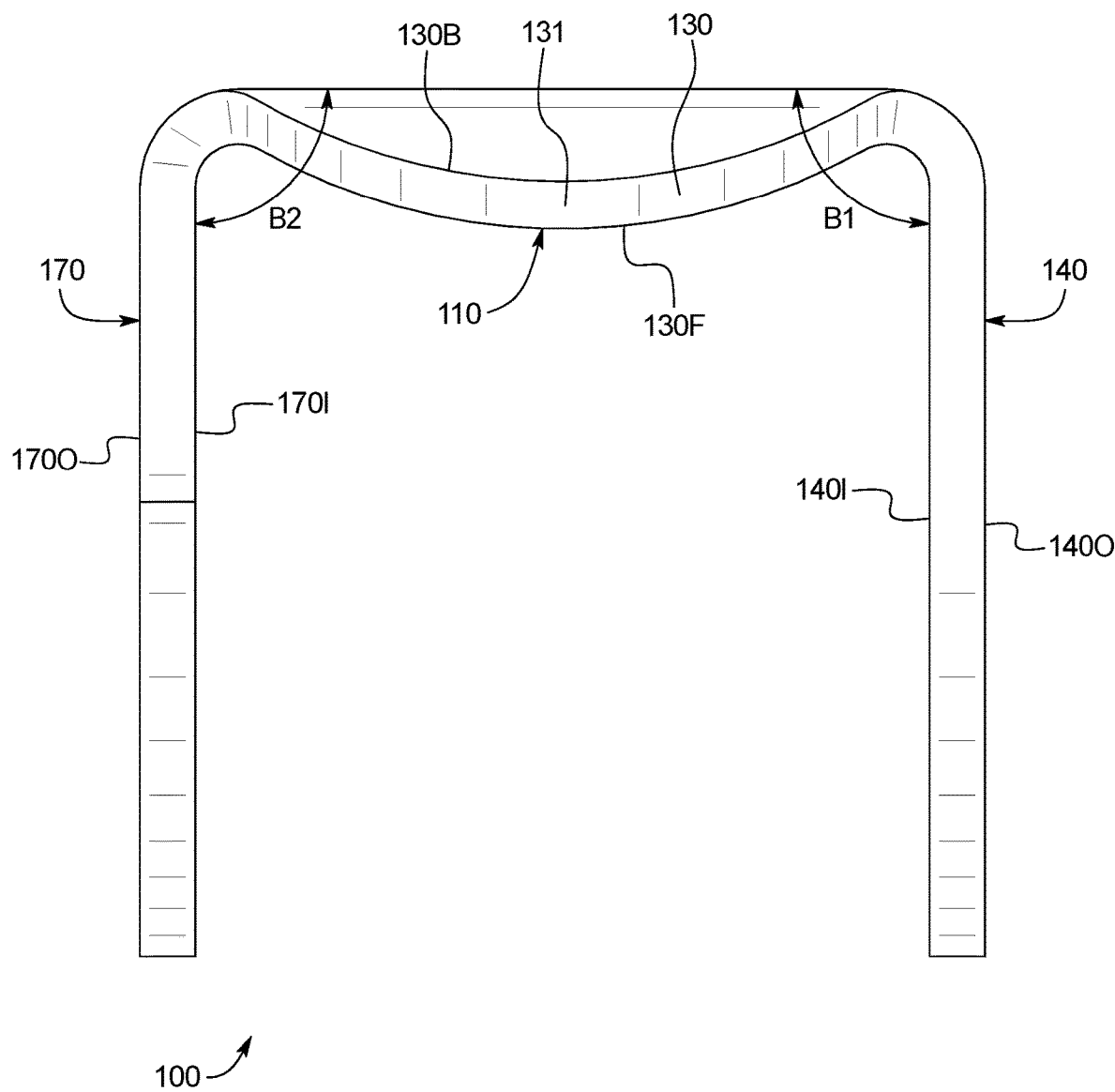
FIG. 6 is an enlarged top view of the wire strand attachment clip of FIGS. 1 and 2.
Figure 7:
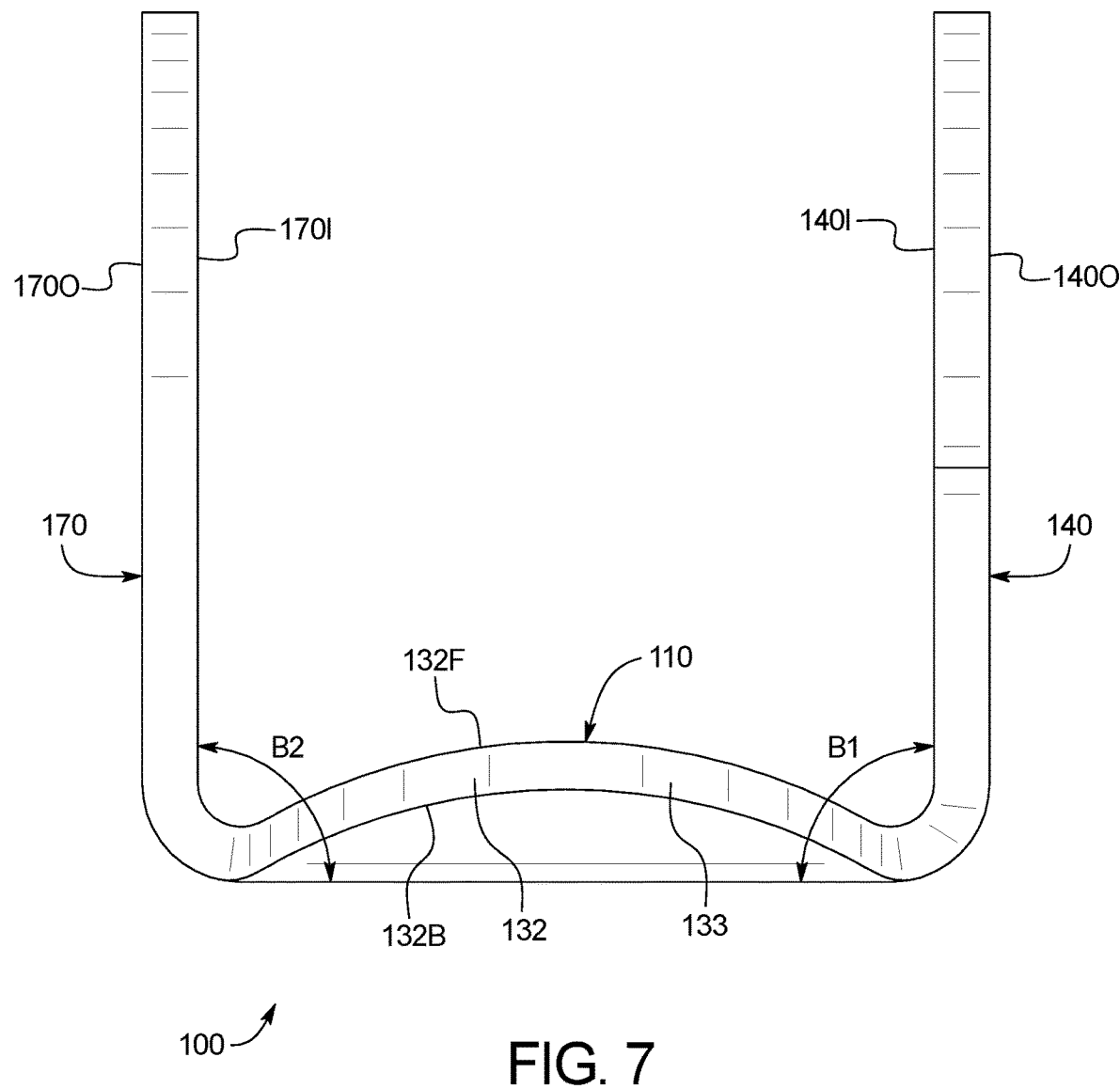
FIG. 7 is an enlarged bottom view of the wire strand attachment clip of FIGS. 1 and 2.
Figure 8:
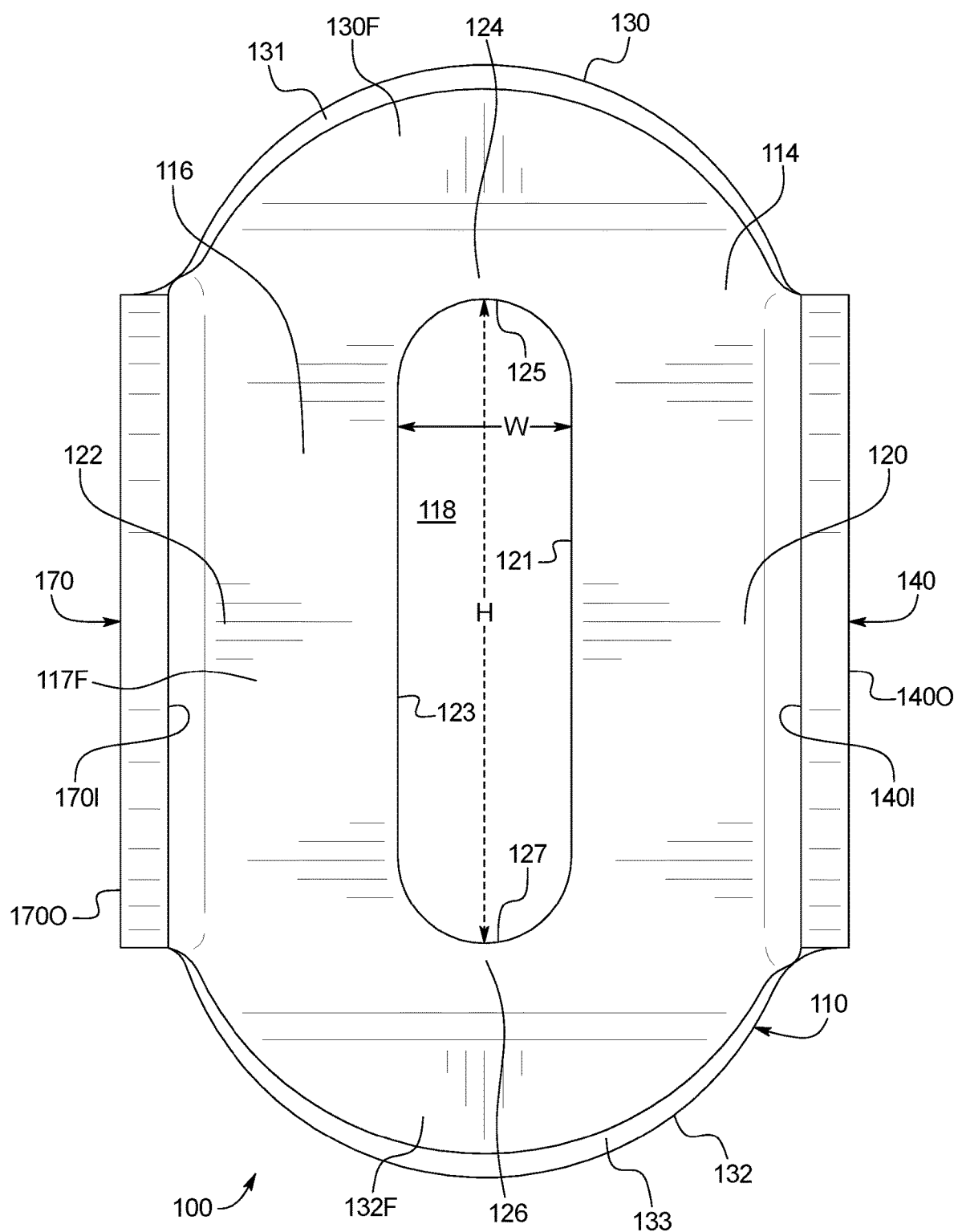
FIG. 8 is an enlarged front view of the wire strand attachment clip of FIGS. 1 and 2, shown before attachment to a T-shaped support post.
Figure 9:
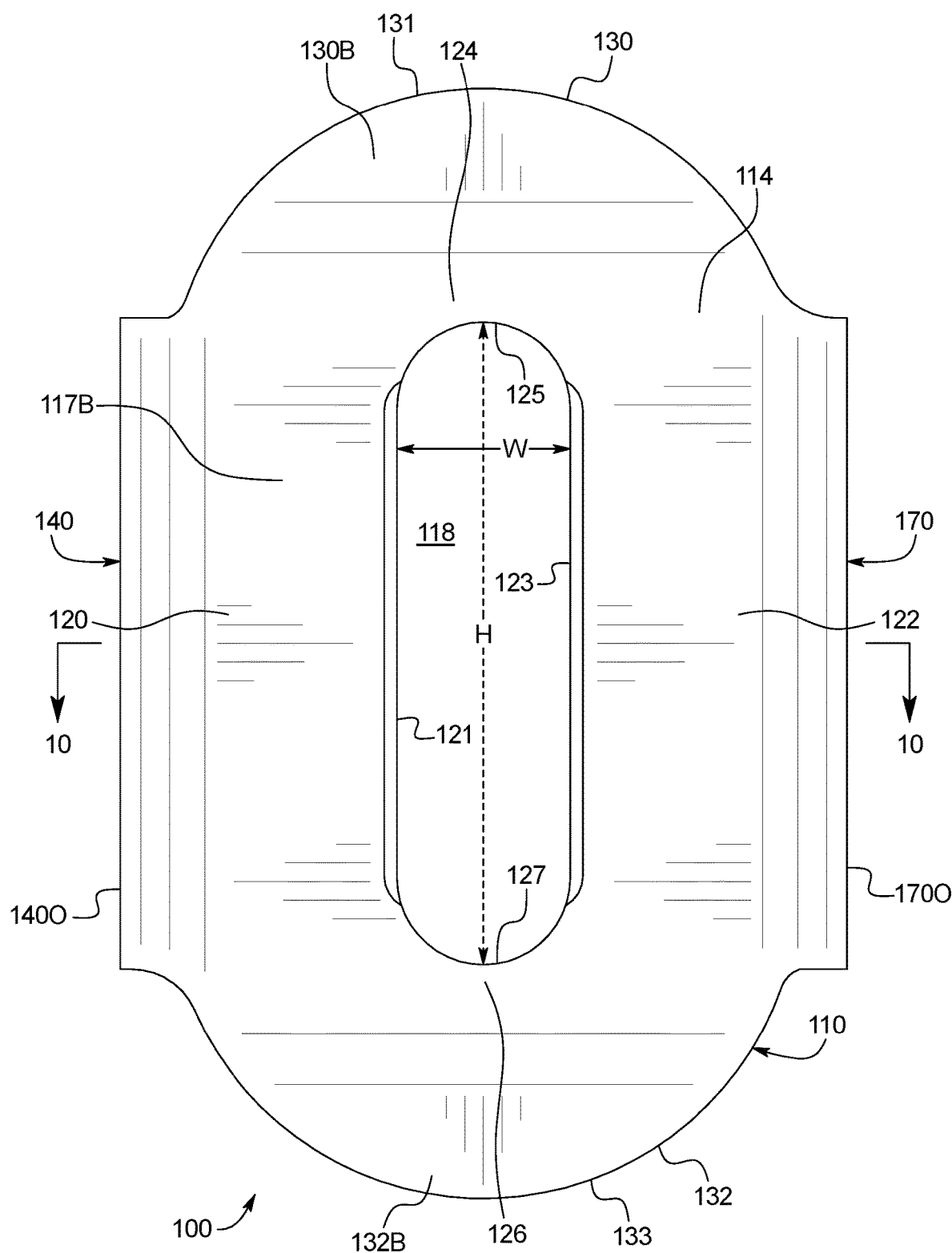
FIG. 9 is an enlarged rear view of the wire strand attachment clip of FIGS. 1 and 2, shown before attachment to a T-shaped support post.
Figure 10:
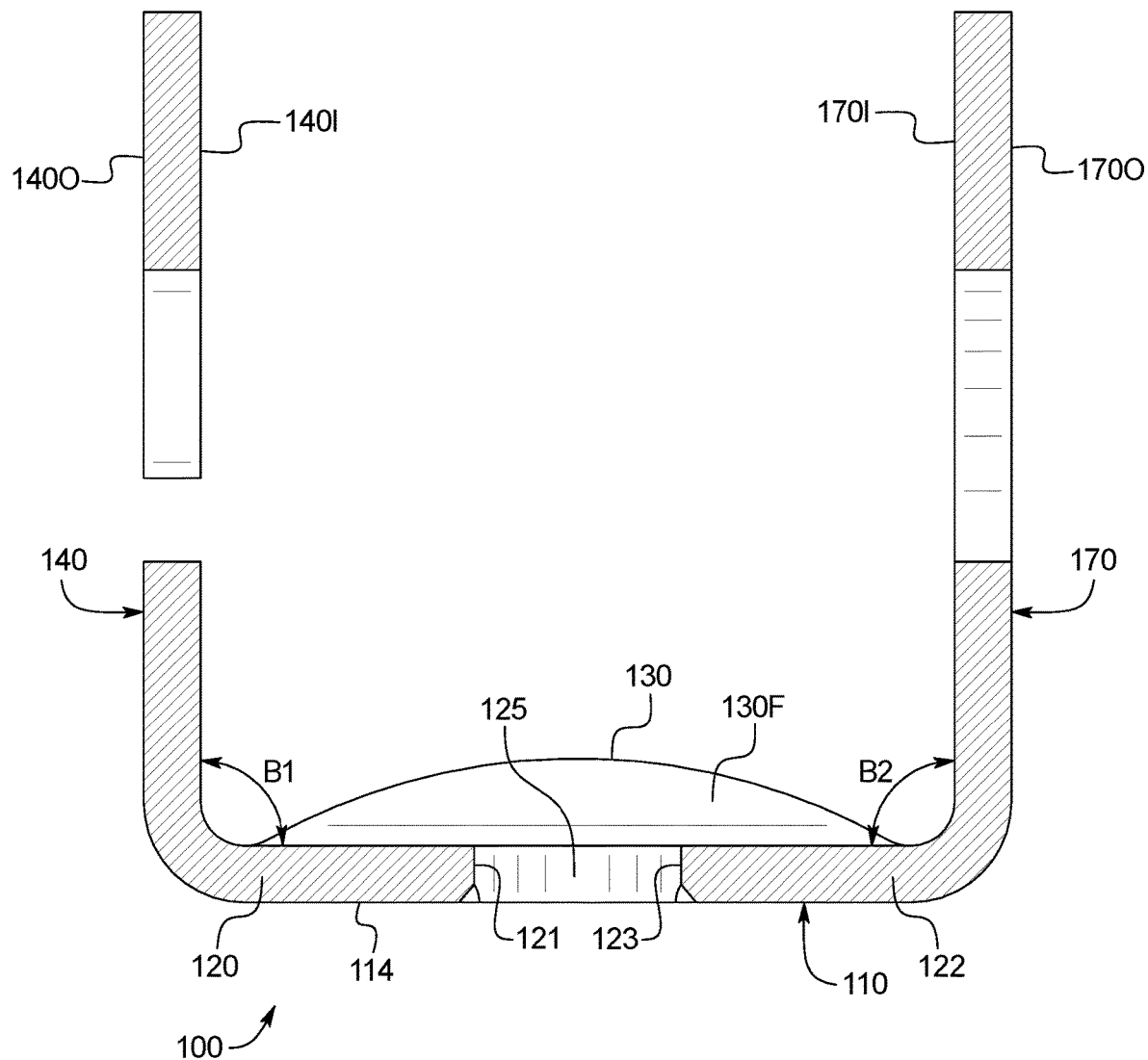
FIG. 10 is an enlarged cross-sectional view of the wire strand attachment clip of FIGS. 1 and 2, taken substantially along line 10-10 of FIG. 9.

In this example embodiment, the first wire strand holder 140 and the second wire strand holder 170 are inversely or oppositely positioned such that the first wire strand receiving areas 142 and second wire strand receiving area 172 are inversely oppositely positioned. This enables the first wire strand holder 140 and the second wire strand holder 170 to co-act to hold the wire strand in the first wire strand receiving area 142 and second wire strand receiving area 172. As shown in FIGS. 4 and 5, the first wire strand holder 140 and the second wire strand holder 170 to co-act to define aligned somewhat partially circular areas that hold the wire strand 40. For example, if the wire strand 40 starts to move upwardly, the first wire strand holder 140 limits the upward movement of the wire strand 40. Likewise, if the wire strand 40 starts to move downwardly, the second wire strand holder 140 limits the downward movement of the wire strand 40. Thus, while this configuration allows for insertion of the wire strand 40 into both of the first wire strand receiving area 142 and second wire strand receiving area 172, this configuration substantially limits the movement of the wire strand 40 out of both of the first wire strand receiving area 142 and second wire strand receiving area 172.

In this illustrated example embodiment, the first wire strand holder 140 and the second wire strand holder 170 are inversely symmetrical relative to each other and with respect to the alignment guide connector 110. It should be appreciated that such components can be inversely non-symmetrical in accordance with the present disclosure. In this illustrated example embodiment, the first wire strand holder 140 and the second wire strand holder 170 are of the same dimensions. It should be appreciated that such components can have different dimensions in accordance with the present disclosure.

It should be appreciated that in alternative embodiments of the present disclosure, the first wire strand holder 140 and the second wire strand holder 170 can be reversed such that the first wire strand receiving areas and second wire strand receiving area are reversed (e.g., with the opening for the first wire strand receiving and holding area at the top and the opening for the second wire strand receiving and holding area at the bottom). It should also be appreciated that in alternative embodiments of the present disclosure, the first wire strand holder 140 and the second wire strand holder 170 can be configured such that the first wire strand receiving areas and second wire strand receiving area are aligned (e.g., with the openings for both the first and second wire strand receiving and holding areas at the top, or with the openings for the first and second wire strand receiving and holding areas at the bottom).

As shown in FIGS. 2, 11, 12, 13, 14, 15, and 16, the wire strand attachment clip 100 and specifically the alignment guide connector 110, the first wire strand holder 140, and the second wire strand holder 170 are configured to be attached to a T-shaped support post 20 to attach a wire strand 40 to that T-shaped support post 20. In this illustrated example, the wire strand 40 is a barbed wire strand. In this illustrated example, the T-shaped support post 20 includes: (1) an elongated core 21; (2) an elongated leg 22 connected to and extending from the back of the elongated core 21; (3) an elongated first side leg 24 connected to and extending from a first side of the elongated core 21; (4) an elongated second side leg 26 connected to and extending from an opposite second side of the front of the elongated core 21; and (5) a plurality of alignment guides 22 extending forwardly from the elongated core 21.

Figure 11:
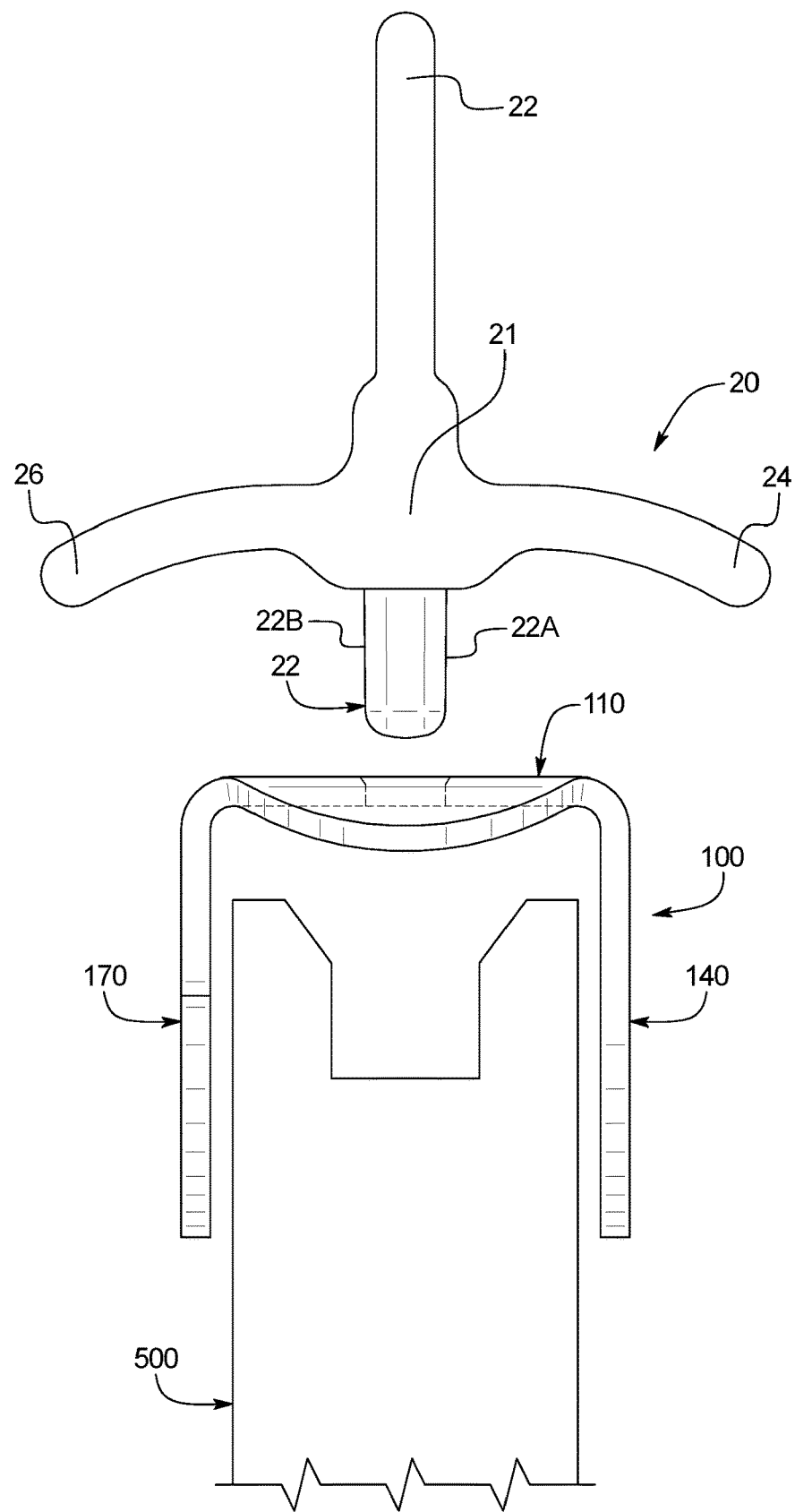
FIG. 11 is an enlarged top view of the wire strand attachment clip of FIGS. 1 and 2, an enlarged top view of the T-shaped support post of FIG. 2, and a fragmentary top view of an example installation tool of the present disclosure, prior to the attachment of the wire strand attachment clip to the T-shaped support post.

More specifically, FIG. 11 shows the positions of the wire strand attachment clip 100 and specifically the alignment guide connector 110, the first wire strand holder 140, and the second wire strand holder 170 relative to, but before being attached to, the T-shaped support post 20. At this point in the attachment process, the wire strand attachment clip 100 is positioned relative to the T-shaped support post 20. Specifically, the alignment guide connector 110 is aligned with the alignment guide 22. In this example, an installation tool 500 is positioned inside of the clip 100. In this example, the installation tool 500 includes two legs configured to engage spaced apart areas of the front surface 117F of the alignment guide engager 116.

Figure 12:
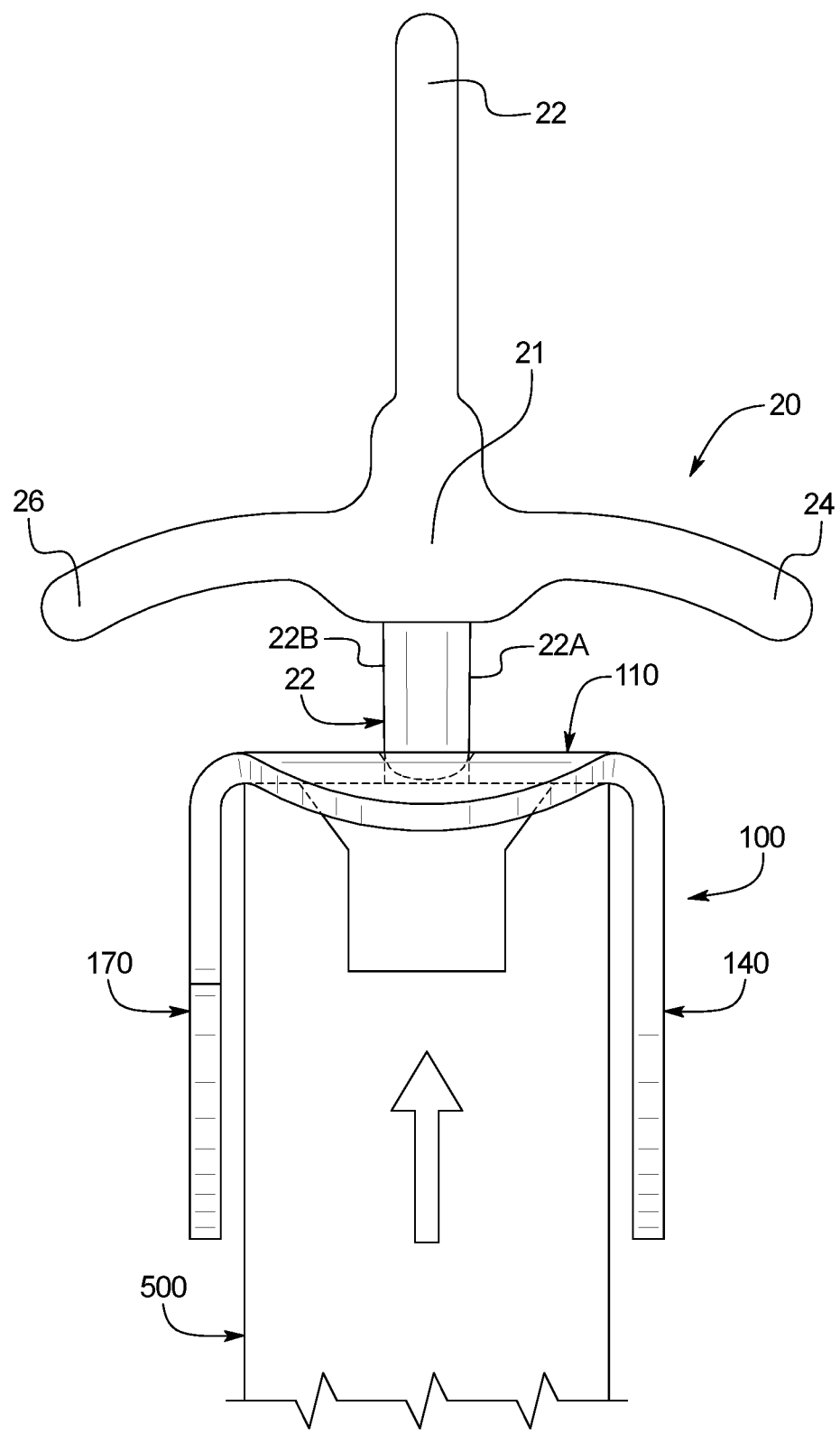
FIG. 12 is an enlarged top view of the wire strand attachment clip of FIGS. 1 and 2, an enlarged top view of the T-shaped support post of FIG. 2, and a fragmentary top view of an example installation tool of the present disclosure, at a point during the attachment of the wire strand attachment clip to the T-shaped support post.

FIG. 12 shows the position of the wire strand attachment clip 100 and specifically the alignment guide connector 110, the first wire strand holder 140, and the second wire strand holder 170 as the alignment guide connector 110 is being attached to the T-shaped support post 20. Specifically, the alignment guide connector 110 is aligned with the alignment guide 22 and partially positioned on or over the alignment guide 22. In this example, the installation tool 500 is positioned inside of the clip 100. The installation tool 500 applies forces to the alignment guide connector 110 such that the first wire strand holder 140 and the second wire strand holder 170 move outwardly to enable the alignment guide 22 to be received in the alignment guide slot 118.

FIGS. 13, 14, and 15 show the position of the wire strand attachment clip 100 and specifically the alignment guide connector 110, the first wire strand holder 140, and the second wire strand holder 170 as the alignment guide connector 110 is attached to the alignment guide 22 of the T-shaped support post 20. More specifically, the inner alignment guide engagement edge 121 and the inner alignment guide engagement edge 123 securely engage the opposite side surfaces 22A and 22B of the alignment guide 22. The first wire strand holder 140 and the second wire strand holder 170 remain at slight outward angles and their natural bias or desire to return to their original resting positions causes the inner alignment guide engagement edges 121 and 123 to apply continuous forces to the opposite side surfaces 22A and 22B of the alignment guide 22. It should thus be appreciated that the inner surfaces of the alignment guide connector 110 engage and hold the wire strand 40 attached to the alignment guide 22 of the T-shaped support post 20 even when various forces are placed on the clip 100, the T-shaped support post 20, and/or the wire strand 40.

It should be appreciated that depending on the size of the alignment guide, the alignment guide may be closer to the wire than shown in FIG. 15. It should be appreciated that depending on the size of the alignment guide, the alignment guide may be in contact with the wire.

As mentioned above, in this illustrated example embodiment, (1) the first side wire stand holder 140 extends at about a 90 degree angle (labeled B1) from the alignment guide engager 114 prior to installation; and (2) the second side wire strand holder 170 extends at about a 90 degree angle (labeled B2) from the alignment guide engager 114 before installation. In this illustrated example embodiment, (1) the first side wire stand holder 140 extends at about a 95 degree angle (labeled C1) from the alignment guide engager 114 after installation; and (2) the second side wire strand holder 170 extends at about a 95 degree angle (labeled C2) from the alignment guide engager 114 after installation. It should be appreciated that one or more of such angles may vary in accordance with the present disclosure. For example, the original angles prior to installation may be more or less than 90 degrees. In various embodiments, the angles after installation range from 90 to 95 degrees, but can be greater than 95 degrees.

In this example embodiment, it is estimated that energy level needed for attaching the clip 100 to a T-shaped support post 20 will be about 40 Joules and the about 29.5 ft lbs (about 13.4 kgs) of force. This energy level will enable manual attachment or attachment using a suitable tool. In this example embodiment, it is estimated that the force level needed for removal of the clip 100 from a T-shaped support post 20 will be about 1672 lbs (about 760 kgs) of force.

It should be appreciated that the present disclosure further contemplates that the (1) the first side wire stand holder 140 and (2) the second side wire strand holder 170 are both closable such that after the wire is positioned in such holders 140 and 170, a suitable tool (not shown) can be employed to close such holders around the wire.

In various embodiments of the present disclosure, this installation of the wire strand attachment clip 100 can be performed manually without the need for any installation tool such as by an installer using one or more of the installer's hands.

In various embodiments of the present disclosure, this installation of the wire strand attachment clip 100 can be performed manually with an installation tool (not shown) such as by an installer using one or more hands with the installation tool.

In various embodiments of the present disclosure, this installation of the wire strand attachment clip 100 can be performed automatically by an automatic installation tool (not shown) such as by an installer using one or more hands holding an automatic installation tool.

In various such embodiments, the installation tool (not shown) includes a magazine that holds a plurality of wire strand attachment clips 100 that are fed through the manual or automatic installation tool.

In various such embodiments, the installation tool (not shown) includes a magazine that holds a plurality of collated group of wire strand attachment clips 100 that are fed through the installation tool. The collated wire strand attachment clips may be collated in any suitable manner (such as discussed below).

Figure 16:
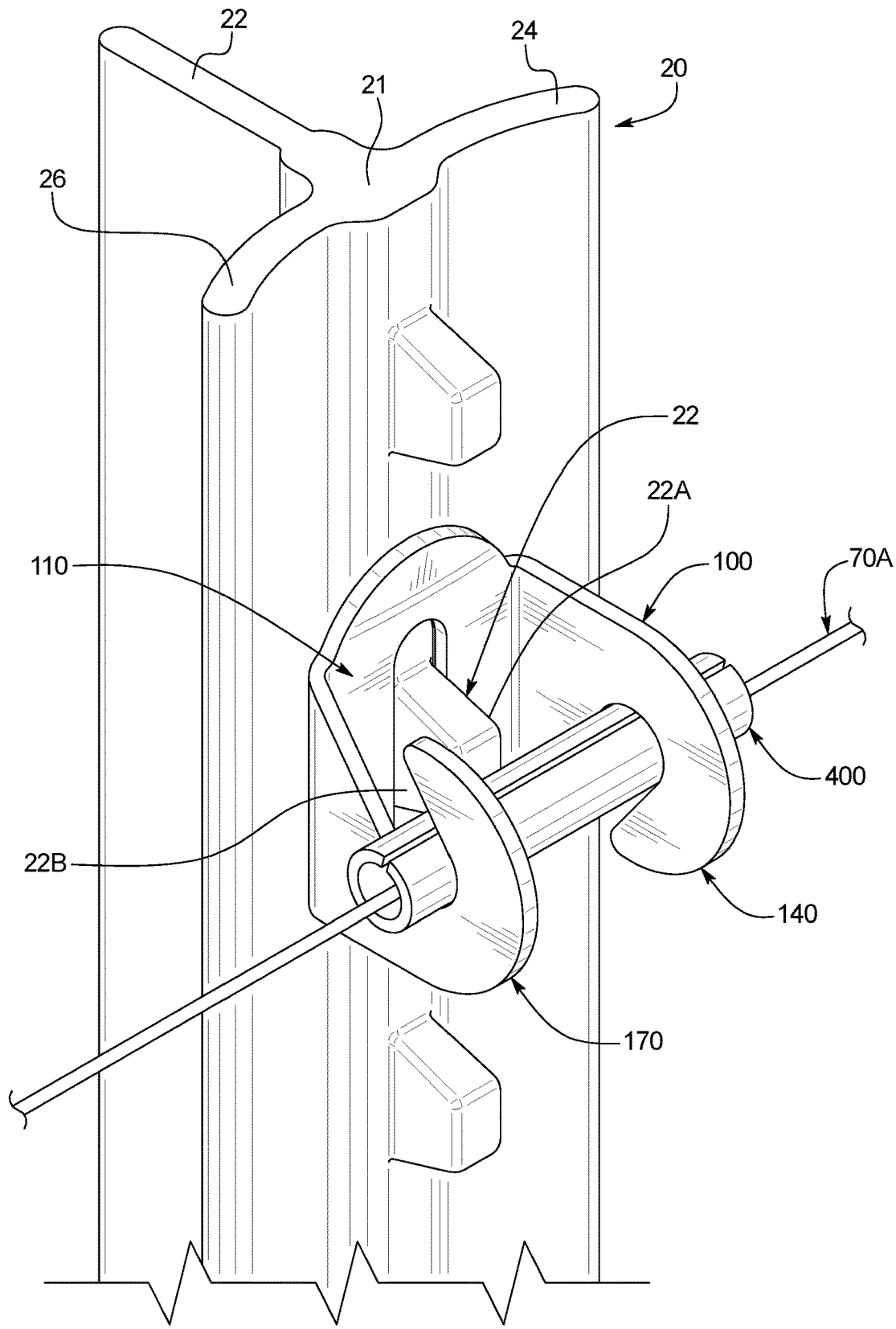
FIG. 16 is an enlarged perspective view of the wire strand attachment clip of FIGS. 1 and 2, an enlarged fragmentary perspective view of the wire strand, an enlarged fragmentary perspective view of the T-shaped support post of FIG. 2 after the attachment process, an enlarged perspective view of an insulator tube around the wire strand and extending through and being held by the wire strand attachment clip.

FIG. 16 shows a wire strand attachment clip 100 attached to a support post and an electrical insulator tube 400 attached to the wire strand 70A configured to be electrically charged. The first and second wire receiving and holding areas are configured to receive the wire strand 70A and the insulator tube 400 to electrically insulate the clip 100 and the support post 20 from an electrically charged wire strand 70A. It should be appreciated that the first and second wire strand holders 140 and 170 are suitably sized and configured to receive and securely hold the insulator tube 400 and the wire strand 70.

FIG. 17 shows one way in which a plurality of the wire strand attachment clips 100 may be attached and collated in a group such as a group for loading into a magazine attached or attachable to an installation tool (not shown) such as a powered automatic installation tool (not shown). The example plurality of wire strand attachment clips 100a, 100b, 100c, 100d, 100e, and 110f, are positioned side to side and attached by at least one clip attachment member such as the example clip attachment member 500. In this illustrated example embodiment, the clip attachment member 500 is a section of a suitable tape such as an adhesive backed paper tape. In this illustrated example embodiment, the clip attachment member 500 is attached to the back surfaces of the respective alignment guide connectors and particularly the respective the alignment guide engagers of the wire strand attachment clips 100a, 100b, 100c, 100d, 100e, and 110f. It should be appreciated that: (1) the quantity of wire strand attachment clips 100 in each group; (2) the quantity of clip attachment members; and (3) the placement of the clip attachment members, may all vary in accordance with the present disclosure. It should also be appreciated that the configuration of the wire strand attachment clips provides a significant advantage over prior known wire strand attachment devices by providing the ability to be collated such as the ability to be collated in a side by side manner for directly adjacent clips. It should also be appreciated that the configuration of the wire strand attachment clip facilitates attachment by one or more clip attachment members in other configuration such as a top to bottom configuration instead of a side to side configuration. It should also be appreciated that the relatively short height of the wire strand attachment clip also facilitates these different collations.

In various alternative embodiments of the present disclosure, the alignment guide engager is elongated and includes an elongated alignment guide receiving slot configured to receive more than one alignment guides of the support post.

In various alternative embodiments of the present disclosure, the alignment guide engager is elongated and includes a plurality of spaced apart elongated alignment guide receiving slots configured to engage a plurality of spaced apart alignment guides of the support post.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The claims are as follows:

1. A wire strand attachment clip comprising:
an alignment guide connector attachable to an alignment guide of a support post, wherein the alignment guide has a height and a width, wherein the alignment guide connector defines an alignment guide receiving slot configured to receive the alignment guide of the support post, wherein a height of the alignment guide receiving slot is greater than the height of the alignment guide, and wherein a width of the alignment guide receiving slot is smaller than the width of the alignment guide;
a first wire strand holder connected to and extending from the alignment guide connector, the first wire strand holder defining a first slot configured to receive a wire strand; and
a second wire strand holder connected to and extending from the alignment guide connector, the second wire strand holder defining a second slot configured to receive the wire strand.

2. The wire strand attachment clip of claim 1, which is formed from a solid flat metal material.

3. The wire strand attachment clip of claim 1, wherein inner side edges of the alignment guide connector that form the alignment guide receiving slot are securely engagable with spaced apart side surfaces of the alignment guide of the support post.

4. The wire strand attachment clip of claim 1, wherein the alignment guide connector includes a first side section that includes a first inner alignment guide engagement edge that partially defines the alignment guide receiving slot and a second side section that includes a second inner alignment guide engagement edge that partially defines the alignment guide receiving slot.

5. The wire strand attachment clip of claim 1, wherein the alignment guide connector includes a first end section that includes a first inner edge that partially defines the alignment guide receiving slot, and a second end section that includes a second inner edge that partially defines the alignment guide receiving slot.

6. The wire strand attachment clip of claim 5, wherein first inner edge of the first end section and the second inner edge of the second end section are configured to securely engage opposite sides of the alignment guide of the support post.

7. The wire strand attachment clip of claim 6, wherein the first inner edge of the first side section includes multiple angled surfaces and the second inner edge of the second side section includes multiple angled surfaces.

8. The wire strand attachment clip of claim 1, wherein the alignment guide connector includes an alignment guide engager that defines the alignment guide receiving slot, a first rigidity tab connected to and extending outwardly from a first end of the alignment guide engager, and a second rigidity tab connected to and extending outwardly from a second end of the alignment guide engager.

9. The wire strand attachment clip of claim 1, wherein the first wire strand holder defines a first wire strand receiving and holding area configured to receive the wire strand and the second wire strand holder defines a second wire strand receiving and holding area configured to receive the wire strand.

10. The wire strand attachment clip of claim 9, wherein the first wire strand receiving and holding area and the second wire strand receiving and holding area extend in inverse directions.

11. The wire strand attachment clip of claim 10, wherein
(a) the first wire strand holder includes a first wire engager connected to and extending from the alignment guide connector, a second wire engager connected to and extending from the first wire engager, and a third wire engager connected to and extending from the second wire engager, wherein the first wire engager, the second wire engager, and the third wire engager define the first wire strand receiving and holding area and a first opening therefore; and
(b) the second wire strand holder includes a first wire engager connected to and extending from the alignment guide connector, a second wire engager connected to and extending from the first wire engager, a third wire engager connected to and extending from the second wire engager, wherein the first wire engager, the second wire engager, and the third wire engager define the second wire strand receiving and holding area and a second opening therefore, wherein the first and second openings are adjacent to opposite ends of the alignment guide connector.

12. A wire strand attachment clip comprising:
an alignment guide connector defining an alignment guide receiving slot configured to receive an outwardly extending alignment guide of a support post, the alignment guide connector including spaced apart inner edges that define the alignment guide receiving slot and that are engagable with opposing side surfaces of the alignment guide, wherein the alignment guide has a width, and wherein a width of the alignment guide receiving slot is smaller than the width of the alignment guide;
a first wire strand holder connected to and extending from the alignment guide connector, the first wire strand holder defining a first wire strand receiving and holding area configured to receive a wire strand; and
a second wire strand holder connected to and extending from the alignment guide connector, the second wire strand holder defining a second wire strand receiving and holding area configured to receive the wire strand, wherein the first and second wire strand receiving and holding areas extend in inverse directions.

13. The wire strand attachment clip of claim 12, wherein the alignment guide connector includes an alignment guide engager, a first rigidity tab connected to and extending outwardly from a first end of the alignment guide engager, and a second rigidity tab connected to and extending outwardly from a second end of the alignment guide engager.

14. The wire strand attachment clip of claim 12, wherein the inner edges include multiple angled surfaces.

15. A collated group of wire strand attachment clips comprising:
a plurality of wire strand attachment clips each including:
an alignment guide connector attachable to an alignment guide of a support post, wherein the alignment guide has a width, wherein the alignment guide connector defines an alignment guide receiving slot configured to receive the alignment guide of the support post, wherein a width of the alignment guide receiving slot is smaller than the width of the alignment guide,
a first wire strand holder connected to and extending from the alignment guide connector, the first wire strand holder defining a first slot configured to receive a wire strand, and
a second wire strand holder connected to and extending from the alignment guide connector, the second wire strand holder defining a second slot configured to receive the wire strand; and
at least one clip attachment member connecting the plurality of wire strand attachment clips.

16. The collated group of wire strand attachment clips of claim 15, wherein each wire strand attachment clip is formed from a solid flat metal material.

17. The collated group of wire strand attachment clips of claim 15, wherein the at least one clip attachment member is secured to the alignment guide connector of each of the plurality of wire strand attachment clips.

* * * * *